(12) United States Patent
Forbes et al.

(10) Patent No.: US 7,108,467 B2
(45) Date of Patent: Sep. 19, 2006

(54) CENTER BEAM CAR WITH DEEP UPPER BEAM STRUCTURE

(75) Inventors: James W. Forbes, Campbellville (CA); Alistair Wilson, Brantford (CA)

(73) Assignee: National Steel Car Limited, (CA)

( * ) Notice: Subject to any disclaimer, the term of this patent is extended or adjusted under 35 U.S.C. 154(b) by 5 days.

(21) Appl. No.: 10/807,905

(22) Filed: Mar. 23, 2004

(65) Prior Publication Data

US 2004/0234353 A1   Nov. 25, 2004

Related U.S. Application Data

(63) Continuation of application No. 09/632,707, filed on Aug. 4, 2000, now Pat. No. 6,709,207, which is a continuation of application No. 09/457,615, filed on Dec. 8, 1999, now Pat. No. 6,237,506.

(51) Int. Cl.
*B60P 7/08* (2006.01)

(52) U.S. Cl. .......................... 410/32; 410/34; 410/100; 105/404

(58) Field of Classification Search .................. 410/32, 410/34, 100, 103, 35, 31; 105/355, 404, 105/411, 414, 407, 416
See application file for complete search history.

(56) References Cited

U.S. PATENT DOCUMENTS

| | | | |
|---|---|---|---|
| 190,542 | A | 5/1877 | Brooks |
| 401,528 | A | 4/1889 | Zurcher |
| 831,648 | A | 9/1906 | Dodds |
| 831,654 | A | 9/1906 | Dodds |
| 934,578 | A | 9/1909 | Stoller |
| 975,861 | A | 11/1910 | Harrigan |
| 2,061,673 | A | 11/1936 | Robinson |
| 2,167,427 | A | 7/1939 | Tatum |
| 2,650,856 | A | 9/1953 | Mashburn, Jr. et al |
| 2,710,221 | A | 6/1955 | Hinners |
| 2,724,611 | A | 11/1955 | Robertson |
| 2,759,737 | A | 8/1956 | Manning |
| 2,768,004 | A | 10/1956 | Wagner |
| 2,801,597 | A | 8/1957 | Ecoff |
| 2,803,201 | A | 8/1957 | Johnson et al. |
| 2,810,602 | A | 10/1957 | Abrams |
| 2,839,328 | A | 6/1958 | Prickett et al. |
| 2,851,301 | A | 9/1958 | Jagsch |
| 2,883,945 | A | 4/1959 | Walker |

(Continued)

FOREIGN PATENT DOCUMENTS

CA   1265388   2/1990

(Continued)

OTHER PUBLICATIONS

Car Builders' Cyclopedia of American Practice, 14th ed., Simmons-Boardman Publishing Corporation, New York, NY, 1937, pp. 209-214.

(Continued)

*Primary Examiner*—Stephen Gordon
(74) *Attorney, Agent, or Firm*—Hahn Loeser & Parks LLP; Michael H. Minns

(57) ABSTRACT

A center beam car has a main deck structure extending laterally from a main center sill, a laterally extending top truss structure, and a central vertically oriented web work structure for carrying vertical shear loads between the top truss and the center sill and decking. The center beam so formed defines bunks upon in which to carry cargo. The upper region of the web-work structure includes a deep upper beam structure that has downwardly extending skirts. The skirts provide an extended bearing area upon against which bundled loads can be secured. The skirts are inwardly reinforced to discourage deflection between adjacent upright members of the vertical web work.

19 Claims, 17 Drawing Sheets

U.S. PATENT DOCUMENTS

| | | | |
|---|---|---|---|
| 2,904,340 A | 9/1959 | Simpson | |
| 2,940,402 A | 6/1960 | Hansen et al. | |
| 2,996,020 A | 8/1961 | Udstad | |
| 3,009,426 A | 11/1961 | Nampa | |
| 3,028,191 A | 4/1962 | Magor | |
| 3,079,874 A | 3/1963 | Hansen et al. | |
| 3,159,112 A | 12/1964 | Tomlinson | |
| 3,240,168 A | 3/1966 | Charles et al. | |
| 3,244,120 A | 4/1966 | Taylor | |
| 3,357,371 A | 12/1967 | Gutridge | |
| 3,485,184 A | 12/1969 | Berry | |
| 3,509,829 A | 5/1970 | Henriksson et al. | |
| 3,659,724 A | 5/1972 | Miller et al. | |
| 3,675,592 A | 7/1972 | Bateson et al. | |
| 3,677,193 A | 7/1972 | Pringle | |
| 3,713,400 A | 1/1973 | Teoli | |
| 3,724,394 A | 4/1973 | Pringle | |
| 3,734,031 A | 5/1973 | Wagner | |
| 3,751,102 A | 8/1973 | Stoneburner | |
| 3,774,554 A | 11/1973 | O'Neill et al. | |
| 3,777,671 A | 12/1973 | Miller et al. | |
| 3,779,411 A | 12/1973 | Moretti, Jr. | |
| 3,788,702 A | 1/1974 | Toboll | |
| 3,806,182 A | 4/1974 | Bateson et al. | |
| 3,814,028 A | 6/1974 | Adler | |
| 3,818,843 A | 6/1974 | Lee | |
| 3,820,476 A | 6/1974 | Harter et al. | |
| 3,820,747 A | 6/1974 | Bateson et al. | |
| 3,841,236 A | 10/1974 | Hammonds et al. | |
| 3,885,506 A | 5/1975 | Mundinger et al. | |
| 3,964,399 A | 6/1976 | Miller et al. | |
| 4,024,821 A | 5/1977 | Yang | |
| 4,079,676 A | 3/1978 | Miller | |
| 4,082,045 A | 4/1978 | McNally et al. | |
| 4,091,742 A | 5/1978 | Cordani | |
| 4,092,039 A | 5/1978 | Lutkenhouse | |
| 4,128,062 A | 12/1978 | Roberts | |
| 4,194,451 A | 3/1980 | Dehner | |
| RE30,388 E | 9/1980 | Mundinger et al. | |
| 4,221,427 A | 9/1980 | Sentle, Jr. et al. | |
| 4,236,459 A | 12/1980 | Teoli | |
| 4,254,714 A | 3/1981 | Heap | |
| 4,331,083 A | 5/1982 | Landregan et al. | |
| 4,348,963 A | 9/1982 | Dancy | |
| 4,361,097 A | 11/1982 | Jones et al. | |
| 4,373,447 A | 2/1983 | Pfister | |
| 4,385,856 A | 5/1983 | O'Neal | |
| 4,408,542 A | 10/1983 | Heap | |
| 4,452,150 A | 6/1984 | Dominguez | |
| 4,478,155 A | 10/1984 | Cena et al. | |
| 4,543,887 A | 10/1985 | Baker | |
| 4,569,289 A | 2/1986 | Gielow et al. | |
| 4,580,844 A | 4/1986 | Farmer | |
| 4,626,017 A | 12/1986 | Robertson | |
| 4,633,787 A | 1/1987 | Przybylinski et al. | |
| 4,637,320 A | 1/1987 | Paton et al. | |
| 4,646,653 A | 3/1987 | Balbi et al. | |
| 4,681,041 A | 7/1987 | Harris et al. | |
| 4,686,907 A | 8/1987 | Woollam et al. | |
| 4,688,976 A | 8/1987 | Rowley et al. | |
| 4,690,072 A | 9/1987 | Wille et al. | |
| 4,738,203 A | 4/1988 | Gielow et al. | |
| 4,751,882 A | 6/1988 | Wheatley et al. | |
| 4,753,175 A | 6/1988 | Harris et al. | |
| 4,756,256 A | 7/1988 | Rains et al. | |
| 4,770,578 A | 9/1988 | Coleman | |
| 4,771,705 A | 9/1988 | Przybylinski et al. | |
| 4,771,706 A | 9/1988 | Lindauer et al. | |
| 4,784,067 A | 11/1988 | Harris et al. | |
| 4,802,420 A | 2/1989 | Butcher et al. | |
| 4,805,539 A | 2/1989 | Ferris et al. | |
| 4,807,722 A | 2/1989 | Jamrozy et al. | |
| 4,876,968 A | 10/1989 | Lindauer et al. | |
| 4,889,055 A | 12/1989 | Jamrozy et al. | |
| 4,901,649 A | 2/1990 | Fehrenbach et al. | |
| 4,911,082 A | 3/1990 | Richmond | |
| 4,944,232 A | 7/1990 | Schlaeger | |
| 4,951,575 A | 8/1990 | Dominguez et al. | |
| 4,966,081 A | 10/1990 | Dominquez et al. | |
| 5,024,567 A | 6/1991 | Dominguez et al. | |
| 5,088,417 A | 2/1992 | Richmond et al. | |
| 5,159,882 A | 11/1992 | Krug et al. | |
| 5,259,322 A | 11/1993 | Dominguez et al. | |
| 5,271,336 A | 12/1993 | Willetts | |
| 5,410,970 A | 5/1995 | Stephenson, Jr. | |
| 5,520,489 A | 5/1996 | Butcher et al. | |
| 5,582,495 A | 12/1996 | Schroeder | |
| 5,626,083 A | 5/1997 | Saxton | |
| 5,692,792 A | 12/1997 | Klar | |
| 5,758,584 A | 6/1998 | Saxton | |
| 5,878,548 A | 3/1999 | Sauer et al. | |
| 5,899,646 A | 5/1999 | Tatina et al. | |
| 5,943,963 A | 8/1999 | Beals | |
| 6,050,202 A | 4/2000 | Thompson | |
| 6,183,176 B1 | 2/2001 | Weiner | |
| 6,199,486 B1 | 3/2001 | Landrum et al. | |
| 6,237,506 B1 | 5/2001 | Forbes | |
| 6,431,085 B1 | 8/2002 | Saxton et al. | |
| 6,470,808 B1 | 10/2002 | Clark et al. | |
| 6,709,207 B1 * | 3/2004 | Forbes | 410/32 |
| 2002/0073885 A1 | 6/2002 | Saxton et al. | |
| 2002/0073890 A1 | 6/2002 | Saxton et al. | |
| 2002/0124767 A1 | 9/2002 | Forbes | |

FOREIGN PATENT DOCUMENTS

| | | |
|---|---|---|
| CA | 2313834 | 1/2002 |
| EP | 0306584 | 3/1989 |
| NL | 37659 | 1/1933 |

OTHER PUBLICATIONS

Car Builders' Cyclopedia of American Practice, 18th ed., Simmons-Boardman Publishing Corporation, New York, NY, 1949-51, pp. 155.

Car Builders' Cyclopedia of American Practice, 19th ed., Simmons-Boardman Publishing Corporation, New York, NY, 1953, pp. 284-285.

Railway Age Weekly, Simmons-Boardman Publishing Corporation, Boston, Conn., Jan. 5, 1959, p. 19.

Car Builders' Cyclopedia of American Practice, 21st ed., Simmons-Boardman Publishing Corporation, New York, NY, 1961, pp. 168-172.

Car Builders' Cyclopedia of American Practice, 21st ed., Simmons-Boardman Publishing Corporation, New York, NY, 1961, pp. 447-448.

Railway Age Weekly, Simmons-Boardman Publishing Corporation, Boston, Conn., 1965, pp. 22-23.

Blodgett, Omer W., "Rigid-frame Knees (Elastic Design)" in Design of Welded Structures, James F. Lincoln Arc Welding Foundation, Jun. 1966, pp. 5.11-1 to 5.11-20.

Railway Age Weekly, Simmons-Boardman Publishing Corporation, Boston, Conn., Mar. 20, 1967, p. 15.

Railway Age Weekly, Simmons-Boardman Publishing Corporation, Boston, Conn., Dec. 18, 1967, p. 58.

Railway Age Weekly, Simmons-Boardman Publishing Corporation, Boston, Conn., Feb. 19, 1968. "RSP Carbuilding Shop Adds Repair Facility", 1 page.

Railway Age Weekly, Simmons-Boardman Publishing Corporation, Boston, Conn., Apr. 28, 1969. "Meet the Convertibles!", 1 page.

Car and Locomotive Cyclopedia of American Practice, 2nd ed., Simmons-Boardman Publishing Corporation, New York, NY, 1970, p. 126.

Car and Locomotive Cyclopedia of American Practice, 2nd ed., Simmons-Boardman Publishing Corporation, New York, NY, 1970, pp. 287 + 289.

Car and Locomotive Cyclopedia of American Practice, 3rd ed., Simmons-Boardman Publishing Corporation, New York, NY, 1974, pp. S3-165 + S3-173 to S3-176.

Car and Locomotive Cyclopedia of American Practice, 3rd ed., Simmons-Boardman Publishing Corporation, Omaha, Nebraska, copyright 1974, pp. 73 + 76.

The Car and Locomotive Cyclopedia of American Practice, 4th ed., Simmons-Boardman Publishing Corporation, Omaha, Nebraska, copyright 1980, pp. 242, 243 + 256.

The Car and Locomotive Cyclopedia of American Practice, 5th ed., Simmons-Boardman Publishing Corporation, Omaha. Nebraska, copyright 1984, p. 169.

Various photographs showing a dropped deck center beam car bearing model No. THRX 3001 manufactured by Thrall, (date and location unknown).

Photographs showing a flatcar bearing model No. BCOL 866688, (date and location unknown).

Various photographs showing a center beam car bearing model No. BNSF 564124 (date and location unknown).

Illustration showing a model of a car built for Pulpwood Service in 1963.

Various photographs taken on Sep. 19, 2000, Chicago, Illinois, USA, showing a dropped deck center beam car bearing model No. THRX 3001 manufactured by Thrall.

Various photographs taken on Sep. 27, 2000, Campbellville, Ontario, Canada, showing a flatcar bearing model No. CN 602376.

Various photographs taken on Sep. 27, 2000, Milton, Ontario, Canada, showing a flatcar bearing model No. BCOL 52098.

Railway Age Weekly, Simmons-Boardman Publishing Corporation, Boston, Conn., Jul. 29, 1968, p. 42D.

Various photographs taken on Apr. 24, 2001 at the Frid Street Yard, Hamilton, Ontario, Canada, showing a dropped deck center beam car bearing model No. GCFX 1002 manufactured by Alstom.

Various photographs taken on Sep. 4, 2001 at the Frid Streed Yard, Hamilton, Ontario, Canada, showing a dropped deck center beam car bearing model No. GBRX 20003 manufactured by Gunderson.

Various photographs taken on Oct. 31, 2001 at the Frid Street Yard, Hamilton, Ontario, Canada, showing a dropped deck center beam car bearing model No. GBRX 20003 manufactured by Gunderson.

Various photographs taken on May 17, 2001 at the Savage Reload Facility, Chicago, Illinois, USA, showing a dropped deck center beam car bearing model No. GBRX 20003 manufactured by Gunderson.

* cited by examiner

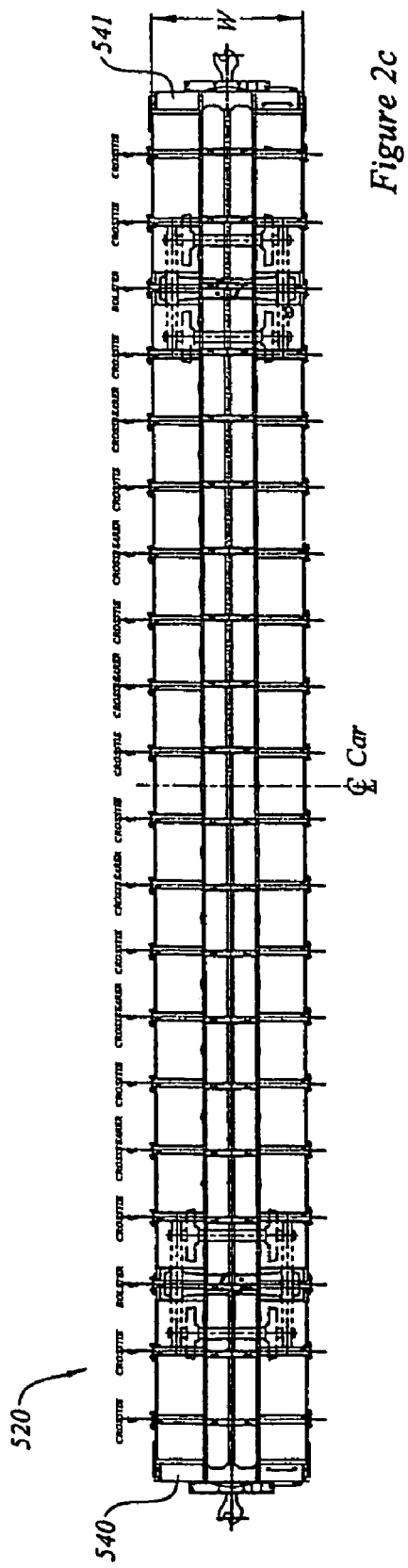
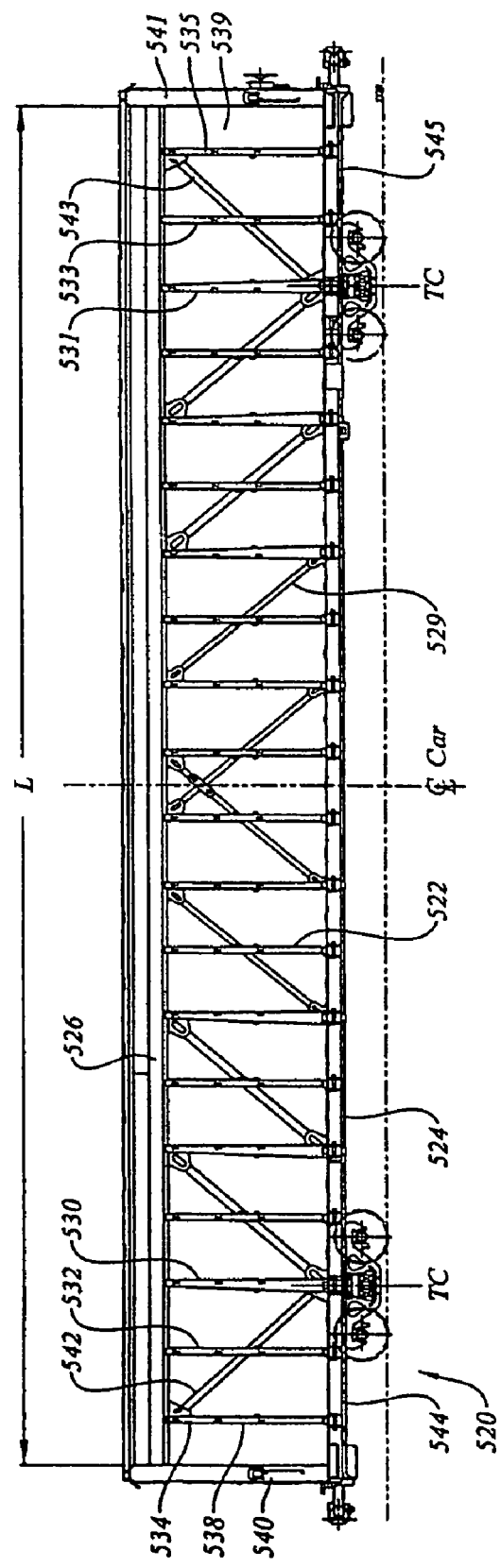
Figure 2c
Figure 2b

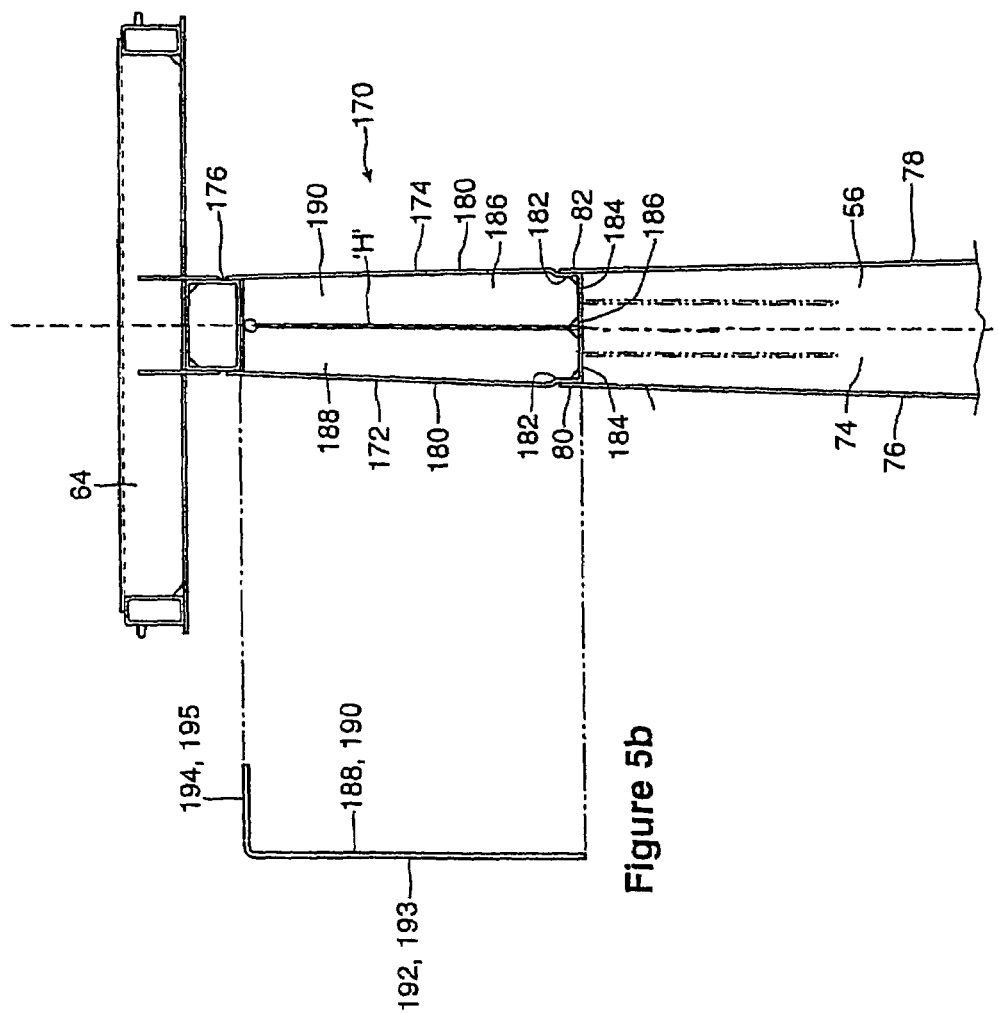

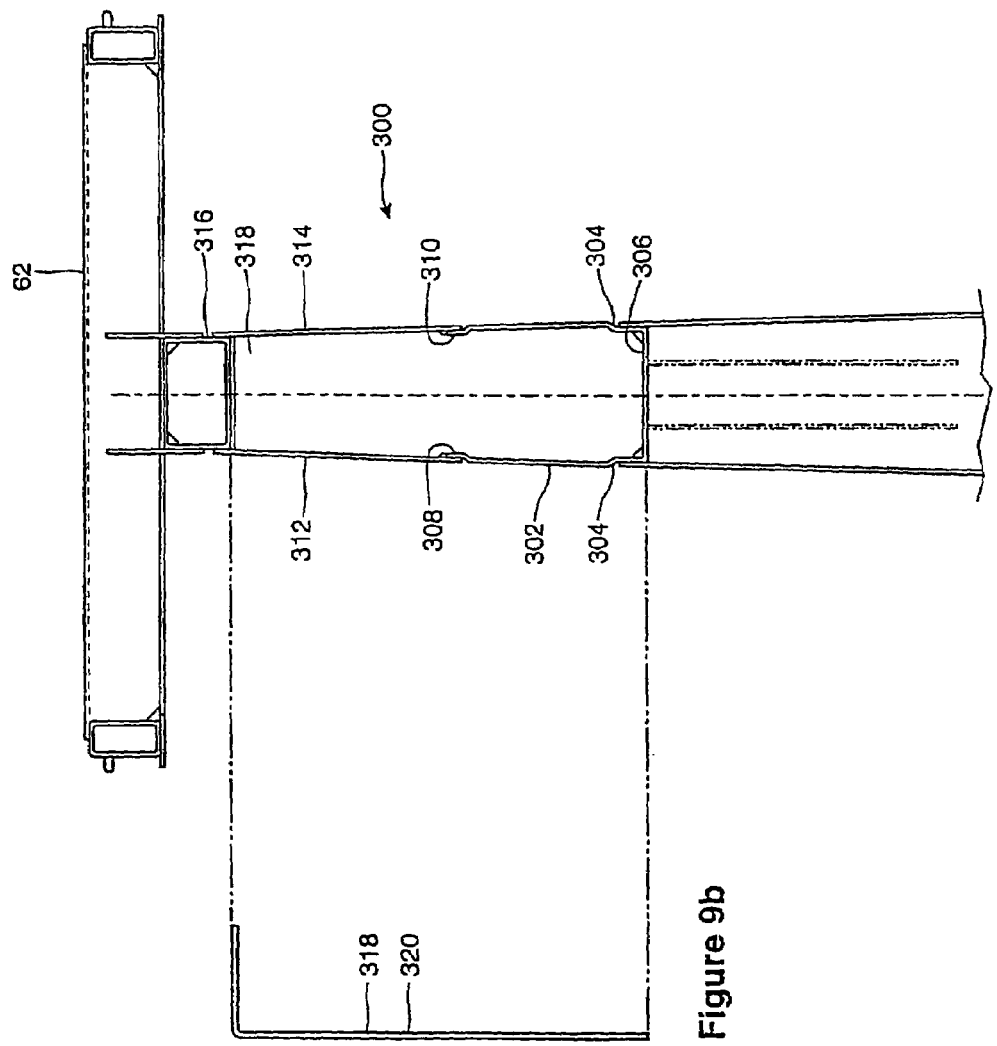

CENTER BEAM CAR WITH DEEP UPPER BEAM STRUCTURE

This application is a continuation of U.S. patent application Ser. No. 09/632,707 filed on Aug. 4, 2000, now issued U.S. Pat. No. 6,709,207 which is a continuation of U.S. patent application Ser. No. 09/457,615 filed on Dec. 8, 1999, which is now issued U.S. Pat. No. 6,237,506. The disclosure of application Ser. Nos. 09/632,707 and 09/457,615 are hereby incorporated by reference.

FIELD OF THE INVENTION

This invention relates generally to center beam rail road cars, and, in particular, to center beam cars having a deepened upper beam structure.

BACKGROUND OF THE INVENTION

Center beam rail road cars have a pair of end structures mounted on railroad car trucks. A center sill extends the length of the car between the end structures. A deck extends laterally outward from the center sill above, and between, the end structures. A pair of end bulkheads stand at the ends of the car and extend transversely to the rolling direction of the car. A center beam structure, typically in the nature of a truss, stands upright from the deck and runs along the longitudinal centerline of the car between the end bulkheads. The center beam is a deep girder beam whose bottom flange is the center sill, and whose top flange is the top truss (or analogous structure) of the car. Typically, a web work structure for carrying vertical shear loads, such as an open framework of posts and diagonal braces, extends between the center sill and the top truss. An upper beam assembly, that is, the upper or top flange end of the center beam, is usually manufactured as a wide flange, or flange-simulating truss, both to co-operate with the center sill to resist vertical bending, and also to resist bending due to horizontal loading of the car while traveling on a curve. Center beam cars are commonly used to transport packaged bundles of lumber, although other loads such as pipe, steel, engineered wood products, or other goods can also be carried.

The space above the deck on each side of the center beam forms a bunk upon which bundles of wood can be loaded. The base of the bunk has risers that are mounted to slant inward, and the center beam itself is tapered from bottom to top, such that when the bundles are stacked, the overall stack leans inward toward the longitudinal centerline of the car. The load is most typically secured in place using straps or cables. The straps extend from a winch device at deck level, upward outside the bundles, to a top fitting. The top fitting can be located at one of several intermediate heights for partially loaded cars. Most typically the cars are fully loaded and the strap terminates at a fitting mounted to the outboard portion of the upper beam assembly. Inasmuch as the upper beam assembly is narrower than the bundles, when the strap is drawn taut by tightening the pawl, it binds on the upper outer corner of the topmost bundle and exerts a force inwardly and downwardly, tending thereby to hold the stack in place tight against the web of the center beam.

Each bundle typically contains a number of pieces of lumber, commonly 2×4, 2×6, 2×8 or other standard size. The lengths of the bundles vary, typically ranging from 8' to 24', in 2' increments. The most common bundle size is nominally 32 inches deep by 49 inches wide, although 24 inch deep bundles are also used, and 16 inch deep bundles can be used, although these latter are generally less common. A 32 inch nominal bundle may contain stacks of 21 boards, each 1½ inch thick, making 3½ inches, and may include a further 1½ inches of dunnage for a total of 33 inches. The bundles are loaded such that the longitudinal axes of the boards are parallel to the longitudinal, or rolling, axis of the car generally. The bundles are often wrapped in a plastic sheeting to provide some protection from rain and snow, and also to discourage embedment of abrasive materials such as sand, in the boards. The bundles are stacked on the car bunks with the dunnage located between the bundles such that a fork-lift can be used for loading and unloading.

It has been observed that when the straps are tightened, the innermost, uppermost boards of the topmost bundle bear the greatest portion of the lateral reaction force against the center beam due to the tension in the straps or cables. It has also been observed that when these bundles bear against the vertical posts of the center beam, the force is borne over only a small area. As the car travels it is subject to vibration and longitudinal inertia loads. Consequently the plastic sheeting may tend to be torn or damaged in the vicinity of the vertical posts, and the innermost, uppermost boards can be damaged.

The physical damage to these boards may tend to make them less readily saleable. Further, whether or not the boards are damaged, if the plastic is ripped, moisture can collect inside the sheeting. This may lead to the growth of molds, and may cause discoloration of the boards. In some markets the aesthetic appearance of the wood is critical to its saleability, and it would be advantageous to avoid this discoloration.

In part, the difficulty arises because the bearing area may be too small. Further, the join between the upstanding web portion of the center beam and the upper beam assembly can coincide with the height of the topmost boards. This join is not always smooth. Further still, when the posts are fabricated, the flanges of the posts may not stand perfectly perpendicular to the webs of the respective posts. That is, the post flanges may not be co-planar with the side webs, or legs, of the adjoining top chord, such that one edge of the flange may be twisted so that it bears harder against the bundles than another.

It is also desirable that the bundles stack squarely one upon another. Although it is possible to use wooden battens at the top end of the center beam, this will tend to cause the top bundle to sit outwardly of its neighbors. It has been observed that a thin wooden batten, of ¾" thickness may tend to bow inwardly between adjacent posts, and may not spread the wear load as much as may be desired. A 1½ inch thick wooden batten may have a greater ability to resist this bowing effect. However, the space available for employing a batten may tend to be limited by the design envelope of the car. Inasmuch as is advantageous to load the car as fully as possible, and given that the design of the car may usually reflect a desire to maximize loading within the permissible operational envelope according to the applicable AAR standard, the use of a relatively thick wooden batten may tend to push the outside edge of the top bundle outside the permissible operational envelope. Wooden battens may also be prone to rotting if subject to excessive exposure to moisture, or may be consumable wear items that may require relatively frequent periodic replacement.

It would be desirable to have an upper beam assembly that is integrated into the structure, that is formed to spread the bearing load across a larger area, that would tend to resist the bowing phenomenon, that would tend not to require frequent replacement, and that would tend not to be prone to rotting.

SUMMARY OF THE INVENTION

In an aspect of the invention there is a center beam rail road car having a longitudinal centerline. The railroad car is supported by rail car trucks at either end thereof. The rail road car comprises a cargo support structure borne by the trucks, upon which lading can be carried. A web work assembly includes an array of posts mounted along the longitudinal centerline of the rail road car. The array extends upwardly of the cargo support structure. The web work assembly has a lower region adjacent the cargo support structure and an upper region distant from the cargo support structure. The upper region of the web work assembly has at least one longitudinally extending structural member mounted thereto. The longitudinally extending structural member has a longitudinally extending face against which loads placed laterally outward thereof can bear. A longitudinally extending lateral reinforcement member is mounted laterally inward of the longitudinally extending structural member to discourage lateral deflection of the longitudinally extending structural member under loads bearing against the longitudinally extending face.

In an additional feature of that aspect of the invention, the longitudinally extending structural member and the reinforcement member are portions of a top chord member.

In another feature, a load limit height is measured upwardly of the cargo support structure, and the face extends from a first height that is at least as high as the load limit height to a second height that is lower than the load limit height. In another additional feature, the face extends between a first height and a second height relative to top of rail, and the distance between the first and second heights is at least 6 inches.

In still another additional feature of that aspect of the invention, the cargo support structure includes decking having a first end, a second end, and first and second bulkheads mounted transversely to the centerline at the first and second ends respectively. The decking has a width, and the cargo support structure has a length measured between the bulkheads. The cargo support structure has a ratio of the length to the width of at least 8:1. In a further additional feature of that aspect of the invention, the ratio is between 8:1 and 9:1.

In an additional feature, the trucks have truck centers spaced apart by a longitudinal truck center distance. The array of posts includes at least two vertical posts mounted at longitudinal stations lying between one of the truck centers and one of the transverse bulkheads mounted nearest thereto. In a still further additional feature, the web work includes a diagonal brace mounted between the one truck center and the transverse bulkhead nearest thereto.

In yet another additional feature, the trucks each have a truck center. The cargo support structure includes decking having a first end, a second end, and first and second bulkheads mounted transversely to the centerline at the first and second ends respectively. Each of the transverse bulkheads are spaced longitudinally outboard of one of the truck centers a distance greater than 8 ft. The structural member extends between the transverse bulkheads.

In still another additional feature of that aspect of the invention, the center beam car has a pair of longitudinally extending faces. One of the faces is located to engage loads placed laterally to one side of the web work assembly. The other of the faces is located to engage loads placed laterally to the other side of the web work assembly. In yet another additional feature, the reinforcement is a web extending between the pair of faces.

In another aspect of the invention there is a center beam rail road car having a longitudinal centerline. The center beam rail road car is supported by rail car trucks at either end thereof. The center beam rail road car comprises a center sill extending between the trucks and a decking structure extending laterally of the center sill, upon which loads can be placed. First and second bulkheads mount transversely relative to the centerline at opposite ends of the decking structure. An open web work structure extends upwardly from the center sill. An upper beam member runs between the bulkheads. The upper beam member is mounted upon the open web work structure upwardly of, and extending parallel to, the center sill. The upper beam member has a pair of laterally spaced apart, outwardly facing surfaces against which cargo placed laterally outboard thereof can bear. The upper beam member has a longitudinally extending reinforcement member mounted laterally inwardly relative to the outwardly facing surfaces.

In an additional feature of that aspect of the invention, the surfaces and the open web work structure have slope continuity. In another additional feature, the web work structure has a taper from bottom to top. The surfaces are angled to match the taper of the web work structure. In still another additional feature, the rail road car conforms to a profile having an AAR plate C limit. The car has a load limit height and a perpendicular distance can be measured from any point on either of the facing surfaces lying below the load limit height, to the plate C limit, and the distance so measured is at least as great as 49 inches. In yet another additional feature, the open web work structure includes an array of upright posts spaced along the longitudinal centerline and diagonal bracing therefore. The posts have notched upper ends. The upper beam member includes a longitudinally extending top chord member formed to seat in the notched upper ends of the posts.

In still yet another additional feature of that aspect of the invention, the top chord member includes a U-shaped pressing. The outwardly facing surfaces are formed integrally therewith. In a further additional feature, the U-shaped pressing has a back and the outwardly facing surfaces each have an inwardly stepped shoulder extending therealong formed to seat in the notches of the posts. In yet an alternative additional feature of that aspect of the invention, the longitudinally extending top chord member is a channel having a back and legs. The back is of a width to seat in the notches of the posts. In another additional feature, the longitudinally extending top chord member is a tube. Skirts are mounted to, and extend upwardly of, sides of the tube to define the outwardly facing surfaces. A portion of the tube extends downwardly beyond the skirts. The notches of the posts are formed to engage the downwardly extending portion of the tube.

In still another additional feature of that aspect of the invention, the trucks have truck centers, wherein the transverse bulkheads are located longitudinally outboard of the truck centers a distance of at least 8 ft., to permit an 8 ft. bundle of lumber to be loaded on the decking structure between each bulkhead and a longitudinal station of the decking structure corresponds to the truck center nearest to the bulkhead. In yet another additional feature, the trucks have truck centers, wherein the open web work structure includes an array of vertical posts. At least one of the posts is mounted at a longitudinal station corresponding to each of the truck centers, and at least two of the posts are mounted at longitudinal stations spaced between each truck center and the respective bulkheads longitudinally outboard thereof.

In another additional feature, the open web work structure includes a plurality of upright posts spaced along the longitudinal centerline of the rail road car and diagonal bracing mounted thereto. Each of the posts has a tapering width transverse to the longitudinal centerline of the rail road car. The posts taper from a wider position adjacent to the decking structure to a narrower portion at a top end adjacent to the upper beam assembly. Each of the posts has a notch defined in the top end thereof. The longitudinally extending member is a top chord having a first U-shaped formed member seated in the notch. The first U-shaped member has a back and upstanding legs. A second U-shaped, formed member has a back and downwardly extending legs. The legs of the first and second U-shaped members include the outwardly facing surfaces. The legs of the first and second U-shaped members are formed at an angle matching the taper of the tapered posts.

In another aspect of the invention there is a center beam rail road car having a longitudinal centerline. The center beam rail road car is supported by rail car trucks at either end thereof. The trucks each have a truck center. The center beam rail road car comprises a center sill extending between the trucks. A decking structure extends laterally of the center sill upon which loads can be placed. The decking structure has first and second ends. First and second bulkheads mount to the decking structure transversely to the centerline at the first and second ends. An open web work structure extends upwardly from the center sill and runs between the bulkheads. An upper beam runs between the bulkheads. The upper beam is mounted upon the open web work structure upwardly of, and parallel to, the center sill. The open web work structure has a pair of longitudinally extending, laterally spaced apart skirt members mounted thereto adjacent the upper beam. The skirt members each have an outwardly facing surface against which cargo placed laterally outboard thereof can bear. The skirts are reinforced laterally inboard thereof to discourage lateral deflection of the faces when cargo placed laterally outward thereof bears against the skirts.

In another aspect of the invention there is a rail road car having a longitudinal centerline. A pair of rail car trucks and a center beam assembly is carried thereupon. The center beam assembly has a center sill. A cargo support assembly extends laterally of the center sill assembly. A pair of first and second transverse bulkheads mount at opposite ends of the cargo support assembly. A plurality of posts extend upwardly from the center sill. The posts have a lower region adjacent the center sill and an upper region distant from the center sill. The center beam assembly has a non-consumable, longitudinally extending structural member mounted to the upper region of the posts and running between the bulkheads above, and parallel to, the center sill. The longitudinally extending structural member presents a bearing surface facing laterally outward relative to the longitudinal centerline of the rail road car, against which cargo can bear.

In an additional feature of that aspect of the invention, the posts have a laterally outwardly facing flange and the laterally outwardly facing bearing surface is mounted flush with the flange. In another additional feature of that aspect of the invention, the posts have a laterally outwardly facing flange, and the bearing surface stands proud thereof a distance less than ¾ inches. In still another additional feature, the bearing surface is a surface of a hollow cell material having an outwardly facing skin. In yet another additional feature, the longitudinally extending structural member is formed of a corrugated section with an outer skin. The outer skin defines the outwardly facing surface against which objects may bear. In still yet another additional feature, the bearing surface is laterally inwardly reinforced to discourage bowing thereof between adjacent pairs of the posts.

In another additional feature of that aspect of the invention, the trucks have truck centers, wherein at least one of the posts is mounted at a longitudinal station corresponding to each of the truck centers. At least two of the posts are mounted at longitudinal stations longitudinally outboard of the truck centers.

BRIEF DESCRIPTION OF THE DRAWINGS

FIG. 2b shows a side view of an alternate center beam car to that of FIG. 1;
FIG. 2c shows a top view of the center beam car of FIG. 2b;
FIG. 4b shows a side sectional view of the detail of FIG. 4a;
FIG. 5a shows an alternate detail to that of FIG. 4a;
FIG. 5b shows a side sectional view of the detail of FIG. 5a;
FIG. 6a shows an alternate detail to that of FIG. 4a;
FIG. 6b shows a side sectional view of the detail of FIG. 6a;
FIG. 7a shows an alternate detail to that of FIG. 4a;
FIG. 7b shows a side sectional view of the detail of FIG. 7a;
FIG. 8a shows an alternate detail to that of FIG. 4a;
FIG. 8b shows a side sectional view of the detail of FIG. 8a;
FIG. 9a shows an alternate detail to that of FIG. 4a;
FIG. 9b shows a side sectional view of the detail of FIG. 9a;
FIG. 10 shows an alternate detail to that of FIG. 4a;
FIG. 11 shows an alternate detail to that of FIG. 4a;
FIG. 12a shows an alternate detail to that of FIG. 4a;
FIG. 12b shows an alternate detail to that of FIG. 12a;
FIG. 12c shows an alternate detail to that of FIG. 12a;
FIG. 12e shows an alternate detail to that of FIG. 12c;
FIG. 13 shows an alternate detail to that of FIG. 4a;
FIG. 14 shows an alternate detail to that of FIG. 4a;
FIG. 15 shows an alternate detail to that of FIG. 4a;
and
FIG. 16 shows an alternate detail to that of FIG. 4a.

DETAILED DESCRIPTION OF THE PREFERRED EMBODIMENT

Figure 1:
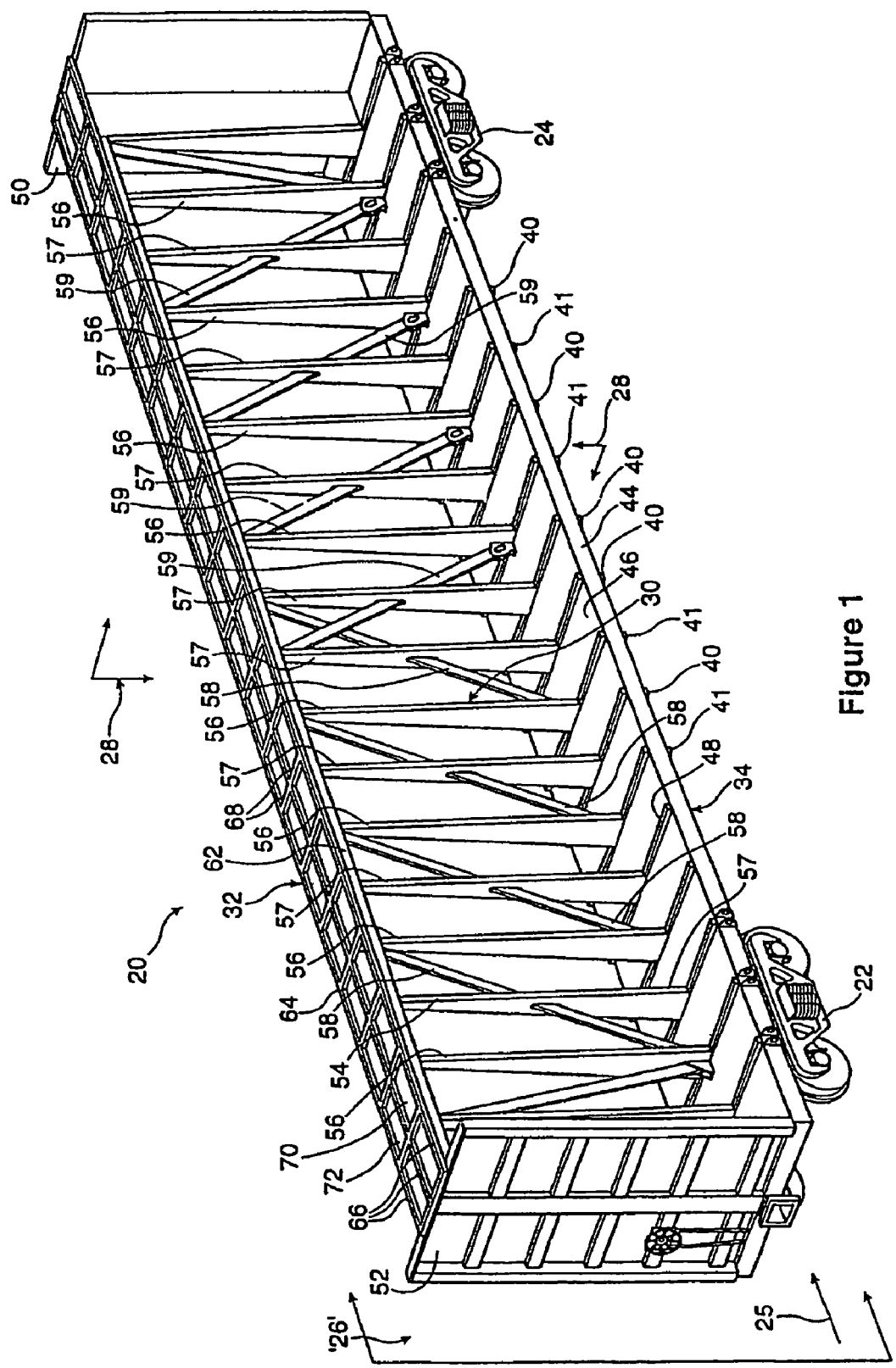
FIG. 1 shows an isometric, general arrangement view of a center beam car according to the present invention.

The description which follows, and the embodiments described therein, are provided by way of illustration of an example, or examples of particular embodiments of the principles of the present invention. These examples are provided for the purposes of explanation, and not of limitation, of those principles and of the invention. In the description which follows, like parts are marked throughout the specification and the drawings with the same respective reference numerals. The drawings are not necessarily to scale and in some instances proportions may have been exaggerated in order more clearly to depict certain features of the invention.

A center beam railroad car is indicated in FIG. 1 generally as 20. It is carried on railroad car trucks 22 and 24 in a rolling direction along rails in the generally understood manner of railcars. Car 20 has a longitudinal centerline 25 lying in a longitudinal plane of symmetry, indicated generally as 26 which intersects the kingpin connections of trucks 22 and 24. It will be appreciated that aside from fittings such as hand grabs, ladders, brake fittings, and couplers, the structure of car 20 is symmetrical about the longitudinal plane of symmetry, and also about a transverse plane of symmetry 28 at the mid-length station of the car. In that light, a structural description of one half of the car will serve to describe the other half as well.

The structure of a center beam car is analogous to a deep beam having a tall central structure to approximate the web of a beam, or a web-like structure or truss assembly, a wide flange at the bottom, and a wide flange at the top. In the case of railroad car 20, the central web-work assembly is indicated generally as 30 and runs in the longitudinal direction (that is, the rolling direction of the car), the top flange function is served by a top truss assembly 32, and the lower flange function is performed by a lower flange assembly in the nature of a lateral support structure 34, upon which cargo can be placed, and that extends laterally outward to either side of a main center sill 36.

Figure 3B:
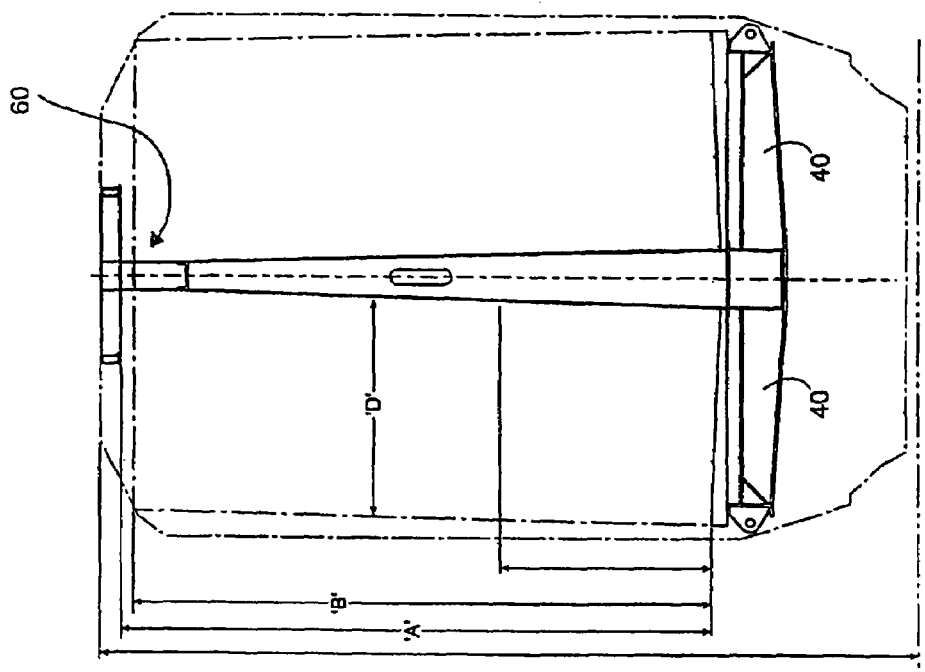
FIG. 3b shows a cross-section of the car of FIG. 2a taken on section '3b—3b'.
Figure 3A:
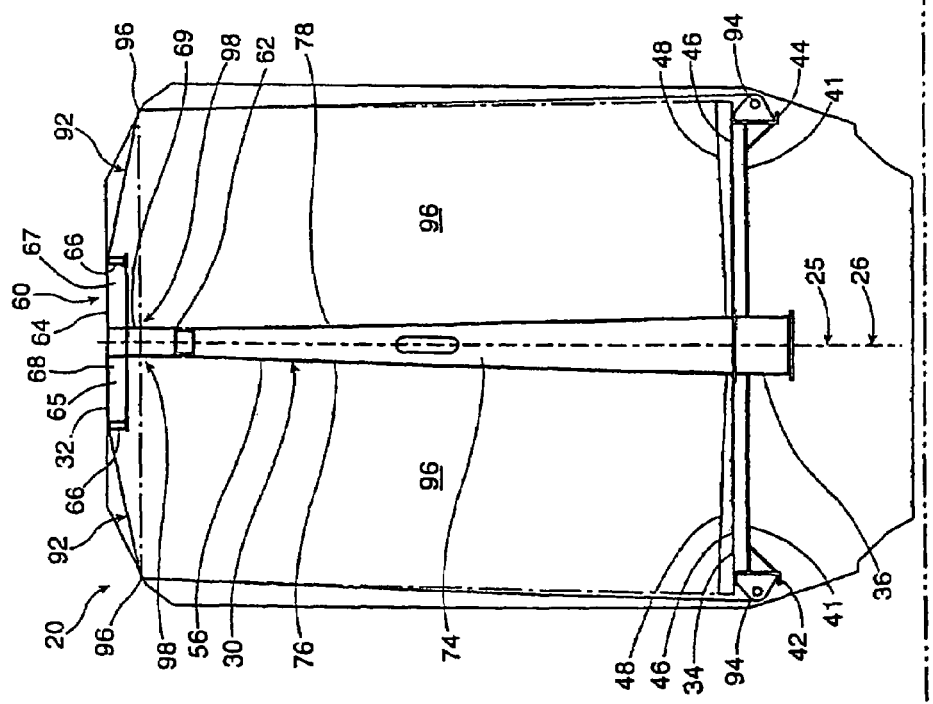
FIG. 3a shows a cross-section of the car of FIG. 2a taken on section '3a—3a'.

In detail, as shown in FIG. 3a, car 20 has at its lowest extremity main center sill 36, in the nature of a fabricated steel box beam that extends longitudinally along the centerline of car 20 throughout its length, having couplers 38 mounted at either end. Cross bearers 40 extend outwardly from center sill 36 to terminate at a pair of longitudinal left and right hand side sills 42, 44 that also run the length of the car. In the car illustrated, alternating cross-bearers 40 and cross-ties 41 extend laterally outward from center sill 36 on approximately 4 ft centers. Decking 46 is mounted to extend between cross-bearers 40, and cross-ties 41 providing a shear connection between adjacent cross-bearers when side loads are imposed on the car. Tapered risers 48 are mounted above the cross-bearers to form the base of a bunk for carrying loads. Risers 48 are tapered so that loads stacked thereupon will tend to lean inwardly toward the center-line of car 20. The combined structure of center sill 36, cross-bearers 40, and side sills 42, 44 and decking 46 provides a wide, lower beam or lower flange assembly extending laterally outward from the longitudinal centerline of car 20.

At either end of car 20 there are vertically upstanding fore and aft end bulkheads 50 and 52 which extend from side to side, perpendicular to the central longitudinal plane 26 of car 20. Running the full length of car 20 between end bulkheads 50 and 52 is an array 54 of upright posts 56, 57. Array 54 is reinforced by diagonal braces 58, 59, that provide a sheer path for vertical loads.

As also shown in FIG. 3a, the array 54 of posts 56 (and 57) is surmounted by an upper beam assembly 60 and deep beam top chord assembly 62. An open framework top truss 64 is mounted above, and connected to deep beam top chord assembly 62. Truss 64 has lateral wings 65 and 67 that are mounted to extend outboard from the central plane of car 20 in a cantilevered manner. Truss 64 has longitudinal stringers 66, and cross members 68.

Each of posts 56 has a central web 74 that lies in a vertical plane perpendicular to the plane 26 of car 20. Web 74 is tapered from a wide bottom adjacent main center sill 36 to a narrow top. The wide bottom portion is about 13½ inches wide, and at the top portion the inward taper is such as to yield a 6 inch width of section at the junction of top chord assembly 62 and top truss 64. At the outboard extremities of web 74 there are left and right hand flanges 76 and 78 that each lie in a longitudinal plane inclined at an angle α defined (from the vertical) by the slope of the taper of web 74. In the preferred embodiment, α is roughly 1.45°. At the top of each post 56, 57 web 74 has been trimmed back to a pair of tabs 80, 82 at the ends of flanges 76, 78. This yields a seat, socket, relief, or rebate in the nature of a generally U-shaped notch or slot 84 into which top chord assembly 62 can seat.

A horizontal cross-section of post 56 will generally have an H-shape, with web 74 lying centrally relative to flanges 76 and 78. Post 57, by contrast, although tapered in a similar manner to post 56, has a horizontal cross-section of a U-shaped channel, with its web being the back of the U, and the flanges being a pair of legs extending away from the back. Each diagonal member 58 (or 59) has a first end rooted at a lower lug 88 welded at the juncture of the base of one of the posts 56 and decking 46 and main center sill 36, and a 45 second diagonal end rooted in an upper lug 86 at the juncture of another adjacent post 56 and top chord assembly 62. Midway along its length, diagonal beam 58 (or 59) passes through a post 57 intermediate the posts 56 to which diagonal 58 (or 59) is mounted. It is intended that the respective flanges of the various posts 56 and 57 lie in the same planes on either side of the central plane 26 of car 20 to present an aligned set of bearing surfaces against which lading can be placed.

The incline of flanges 76 and 78 is such that they lie at roughly a right angle to the inward taper of rungs 48 so that generally square or rectangular bundles can be stacked neatly in the clearance opening of the bunk defined between the underside of the top truss 64 and rungs 48.

In the preferred embodiment of FIGS. 2a, 3a, 3b, 4a and 4b, upper beam assembly 60 can be defined as the combination of top chord assembly 62 and top truss 64. It has a cross section in the shape, generally, of a 'T', with the cross-bar of the 'T' being defined by wings 65 and 67 of top truss 64, and the stem 69 of the 'T' being defined by top chord assembly 62, described more fully below.

Straps 92 are provided to attach to the outboard, distal extremities of wings 65 and 67 of top truss 64, to be wrapped outboard of the load, and to be tightened by a come-along, a winch, a pawl-and-ratchet type of mechanism, indicated generally as 94, or similar tightening device mounted to the respective side sill 42 or 44. An operator turns mechanism 94 with the aid of an extension bar or handle (not shown). When tightened, straps 92 bear against the outboard, upper corners of bundles indicated as 96, tending to force their inboard, upper regions, indicated generally as 98, most tightly against the upright car structure that extends along plane of symmetry 26, namely array 54 and the outer shank, or skirt of stem 69 of upper beam assembly 60.

Figure 2A:
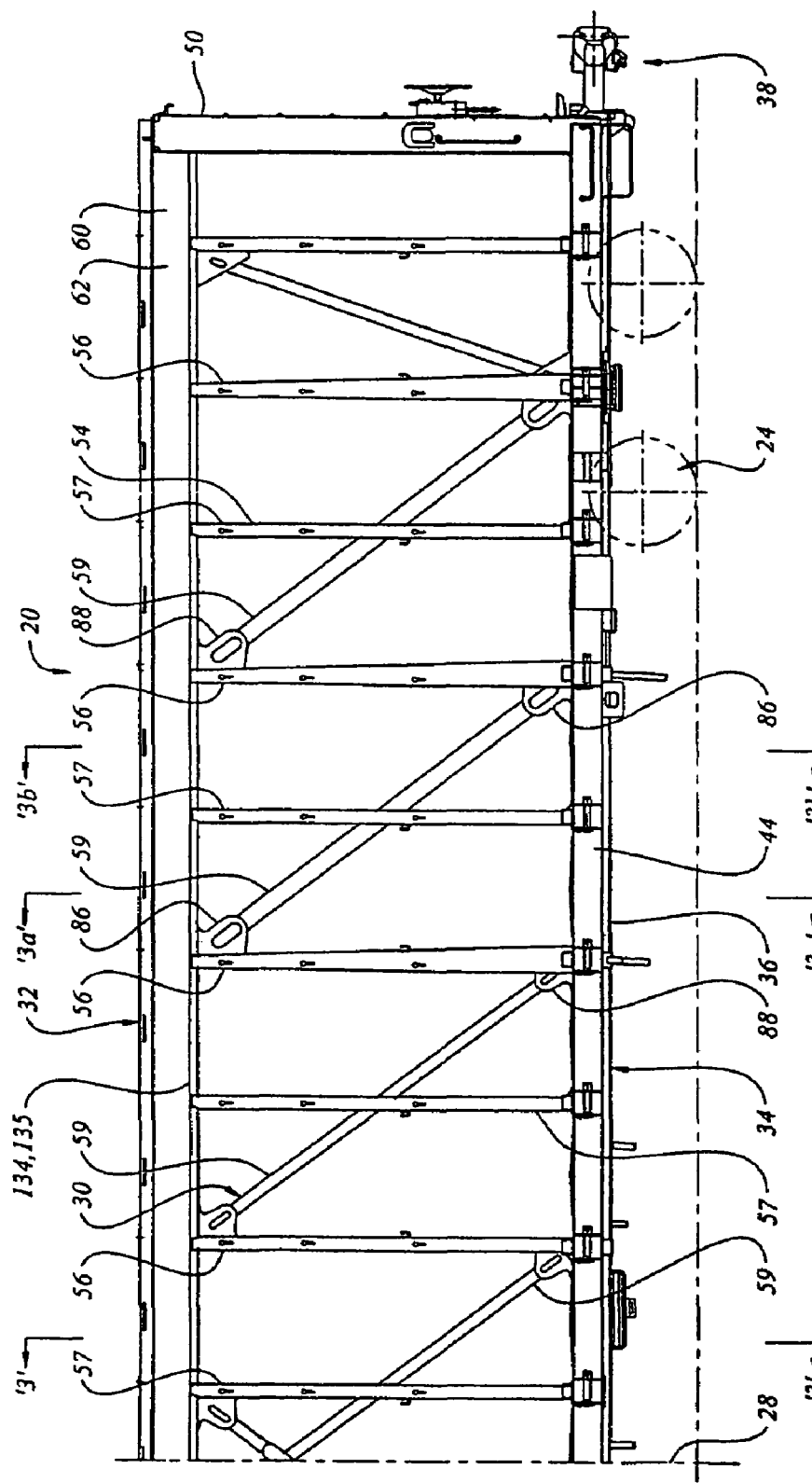
FIG. 2a shows a side view of one half of the center beam car of FIG. 1.

The preferred embodiment illustrated in FIGS. 2a, 3a, 3b, 4a and 4b has an inside loading clearance indicated as 'A' of 137 3/16 inches perpendicular to rungs 48. It also has a loading limit indicated as 'B' extending perpendicular to the slope of web 74, at a height 132½ inches above, and measured perpendicular to, rungs 48. The nominal load height is then 132 inches for 4 bundles at 33 inches each, including dunnage. The nominal load height, in general, for 3½ inch bundles of kiln dried lumber is thus the largest integer multiple of 33 inches that is less than the load limit height. In the illustrations of FIGS. 2a, 3a and 3b, this loading limit permits 49 inch wide bundles to fall within the loading envelope defined by AAR plate 'C'. It also permits a load 131 inches high and 51 inches wide to fall within the desired loading envelope of AAR plate C.

Figure 4B:
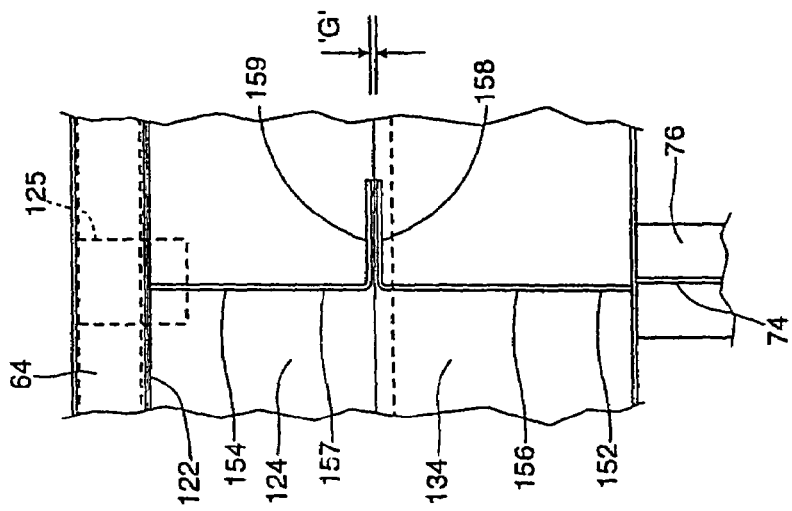
Figure 4A:
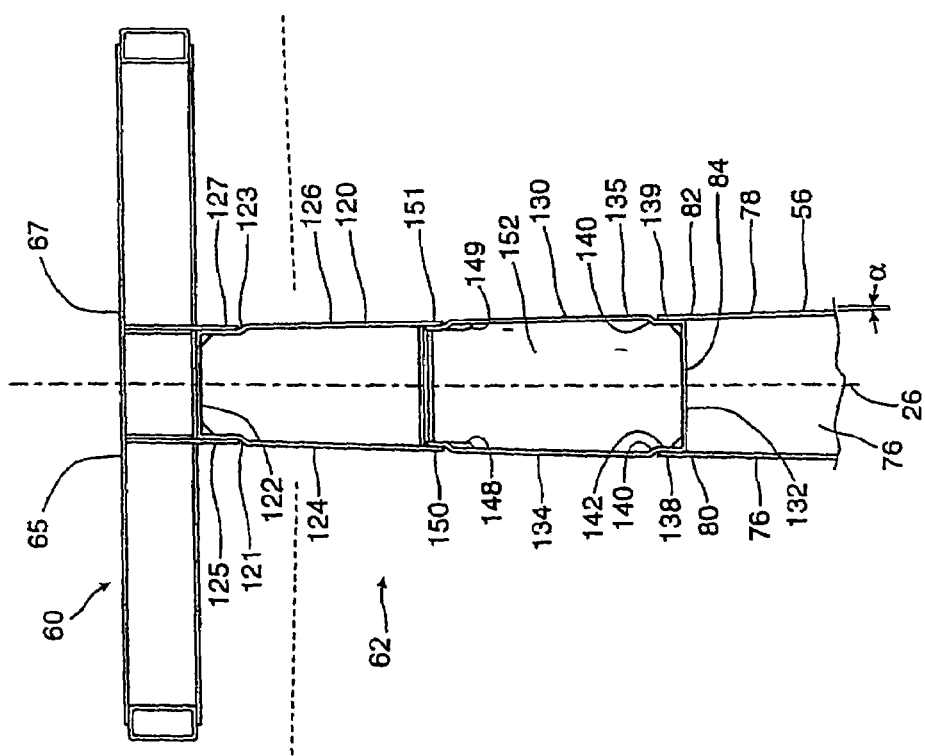
FIG. 4a shows a detail of the section of FIG. 3.

Top chord assembly 62 is shown in cross-section in FIGS. 4a (as viewed along the beam) and 4b (a side view taken on the section of plane 26). It includes a first, or upper formed section 120 in the shape of an inverted U, having a back 122 and left and right hand legs 124, 126. Legs 124, 126 are splayed outwardly relative to the vertical at angle α to match the angle of the taper of the flanges of posts 56 and 57. Upper formed section 120 also has inwardly stepped shoulders 121 and 123 to accommodate the mating ears of gusset plates 125 and 127 which join top truss 64 to top chord assembly 62. Top chord assembly 62 also includes a second formed section 130 that is generally U-shaped, having a back 132, and a pair of left and right hand legs 134 and 135. Legs 134 and 135 each have a proximal region 138, 139 relative to back 132 that is stepped inwardly to form a shoulder 140 and a neck 142 of a size to nest between tabs 80, 82 of post 56 (or 57). Tabs 80, 82 are formed by trimming back web 74 locally to conform to the depth of shoulder 140. Legs 134, 135 also each have an inwardly stepped toe 148, 149 stepped inward a distance equal to the wall thickness of legs 134, 135 such that toes 150, 151 of legs 124, 126 of member 120 can overlap, and seat outside of, outside toes 148, 149 respectively, and be fillet welded in place. Legs 134 and 135 are angled inward to yield slope continuity with both legs 124 and 126 and also with flanges 76 and 78 of post 56 (or the corresponding flanges of post 57 as the case may be). That is, legs 134 and 135 are toed inward at the same angle from the vertical at which legs 124, 126 are splayed outward such that the exterior surfaces are flush with, and lying in the planes of, the respective flanges of posts 56 and 57. The exterior surfaces so defined can be termed skirts.

Gussets 152 and 154 are welded inside formed section 130 and 120, respectively, at longitudinal stations along the length of car 20 corresponding to the various longitudinal stations of the webs of posts 56 and 57 respectively, thus providing a substantially continuous web from main sill 36 to top truss 64. There is, however, a web discontinuity between gusset 152 and gusset 154 indicated by gap 'G', seen in FIG. 4b. In light of this discontinuity, gussets 152 and 154 have a main web leg 156, 157 that, when installed, lies in the vertical plane of web 74 and a toe 158, 159 extending at a right angle therefrom, lying in a horizontal plane. The lateral edges of toes 158 and 159 are welded along the inside faces of toes 148, 149 and 150, 151 respectively and extend a distance comparable to the width between the respective toes at that point. In the preferred embodiment the overall height of top chord assembly 62 is 27 inches, with ¼ inch wall thickness on legs 156, 157, 134 and 135. In the preferred embodiment the length of legs 134, 135 is 13.5 inches, and the overall length of legs 156, 157 is 14.5 inches. Nominally, shoulder 140 overlaps tabs 80 and 82 by 2 inches. That is, tabs 80, 82 extend 2 inches beyond web 74. Toes 158 and 159 are both 6 inches long, and the nominal width of gap 'G' is about 6.75 inches.

In this way, when assembled, legs 134, 135 and 156, 157 form respective left and right hand outwardly facing bearing surfaces against which a load may bear, and over which a reaction force to tension in the tightening straps can be spread. In the span between the stations of adjacent posts 56 and 57, the skirts, or bearing surfaces, formed in this way are reinforced by the laterally inward web, (that is, back 132) which connects both skirts (that is, legs 124 and 134, and legs 126 and 135). The laterally inward reinforcement need not be immediately behind the respective skirt or facing, but rather can be offset, as illustrated in FIG. 4a, with the influence of the web stiffening the face some distance away. The web is "inward" of the skirts in the sense of lying behind, or shy of, the profile of the contact interface with the wood bundles, since the reinforcement lies toward the centerline of the rail car, rather than proud of, the respective skirt faces. In this way an inwardly disposed stiffener will not protrude and rub against an object bearing against the outwardly facing surface of the respective skirt.

In an alternative embodiment shown in FIGS. 5a and 5b, a deep beam section 170 has left and right hand formed sections 172, 174 surmounted by a rectangular tube 176, upon which top truss 64 is mounted. Each of sections 172, 174 has a main sheet 180, an inwardly stepped shoulder 182, an inwardly extending leg 184 and an upturned toe 186. In place of gussets 152 and 154, section 170 has gussets 188, 190 having a main, vertical leg 192, 193 and a horizontal leg 194, 195. Vertical legs 192, 193 are contoured to match the inside wall shape of formed sections 172, 174 respectively, and are located at longitudinal stations to correspond to the longitudinal stations of the webs of posts 56, 57, as above. Vertical legs 192, 193 are separated by a vertically extending gap having a width 'H'. Once gussets 188, 190 are welded in place, formed sections 172, 174 are welded along the seam where legs 184 of sections 172, 174 abut along the centerline of car 20. As above, the step in sections 172, 174 is of a size to seat between tabs 80, 82 of posts 56 (or 57), and the distal tips of main sheets 180 are fillet welded to the side faces of tube 176. As above, there is slope continuity between main sheets 180 and the corresponding flanges 76, 78 of posts 56, 57.

Figure 6B:
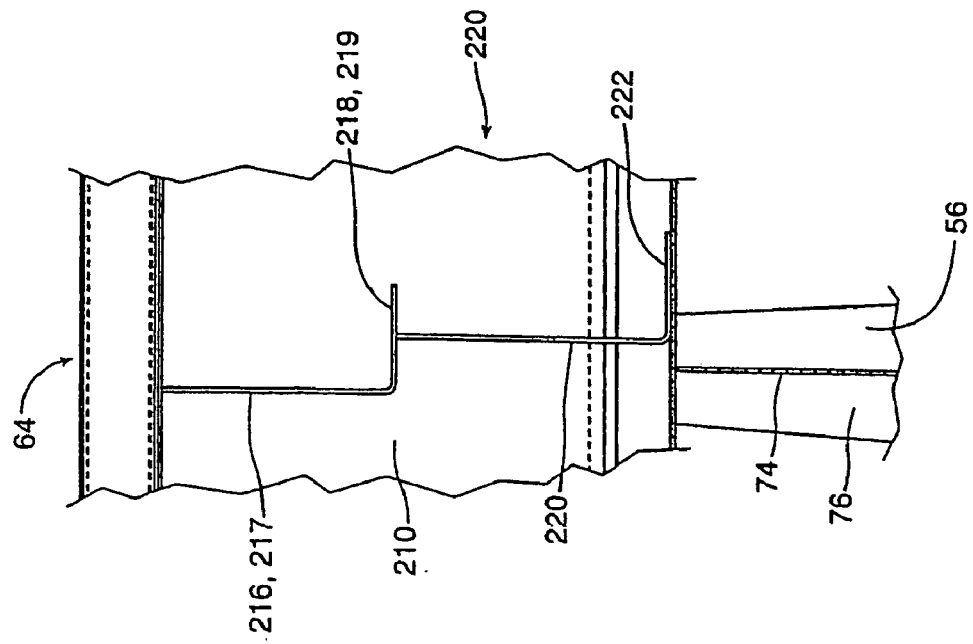
Figure 6A:
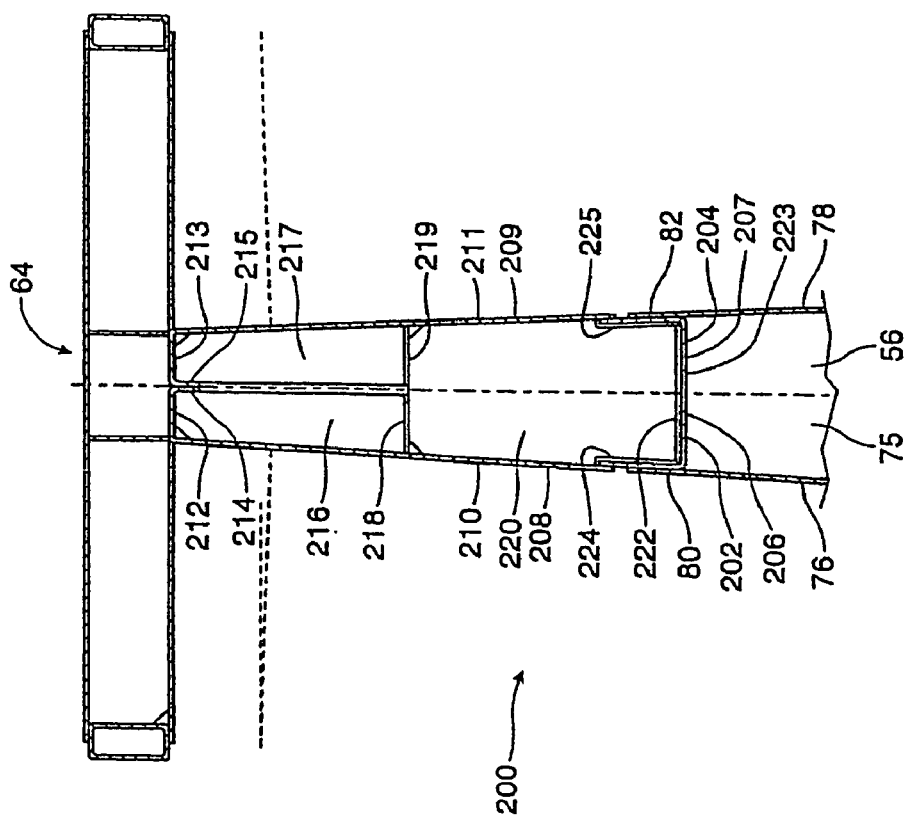

In the alternative embodiment of FIGS. 6a and 6b, a deep upper beam assembly 200 has a pair of angle irons 202 and 204 welded longitudinally inside tabs 80 and 82 of posts 56 and 57. Angle irons 202 and 204 each have an inwardly extending toe 206, 207 which bottoms on the cut edge of web 74, and an upwardly extending leg bent to conform to the slope of flanges 76 and 78 of posts 56 and 57. Beam 200 also has a pair of left and right formed sections 208, 209 each having a main sheet portion 210, 211, an inwardly extending leg 212, 213 and a re-entrant toe 214, 215.

On assembly, L-shaped gussets 216, 217 are welded in each of sections 208, 209. Gussets 216 and 217 each have a profile to match the inside profile of the upper regions of main sheet portions 210, 211, legs 212, 213 and toe 214, 215. The toes of gussets 216 and 217 are welded along their outboard edges to the inside face of main sheet portions 210, 211. Sections 208 and 209 are welded along the centerline seam between abutting toes 214 and 215. A further, main, gusset 220 is trimmed to a shape to permit welding of its top edge to the underside of the toes 218, 219 of gussets 216, 217, its side edges to the inner face of the lower regions of main sheet portions 210 and 211; once welded in this manner, the base leg 222 of gusset 220 can be welded to toes 206 and 207 of angle irons 202 and 204, with a plug weld 223 formed to fill the longitudinal gap therebetween. Gusset 220 is also trimmed to have reliefs 224, 225 to permit entry between the upwardly extending legs of angle irons 202, 204. Gussets 216, 217 and 220 are located at longitudinal stations that correspond generally to the longitudinal stations of posts 56 and 57 as the case may be. Legs 212, 213 of sections 208, 209 form, ideally, a flat surface to weld to top truss assembly 64, as before. Similarly, when installed, main sheet portions 210, 211 have slope continuity with flanges 76 and 78 of posts 56 and 57.

Figures 7A, 7B:
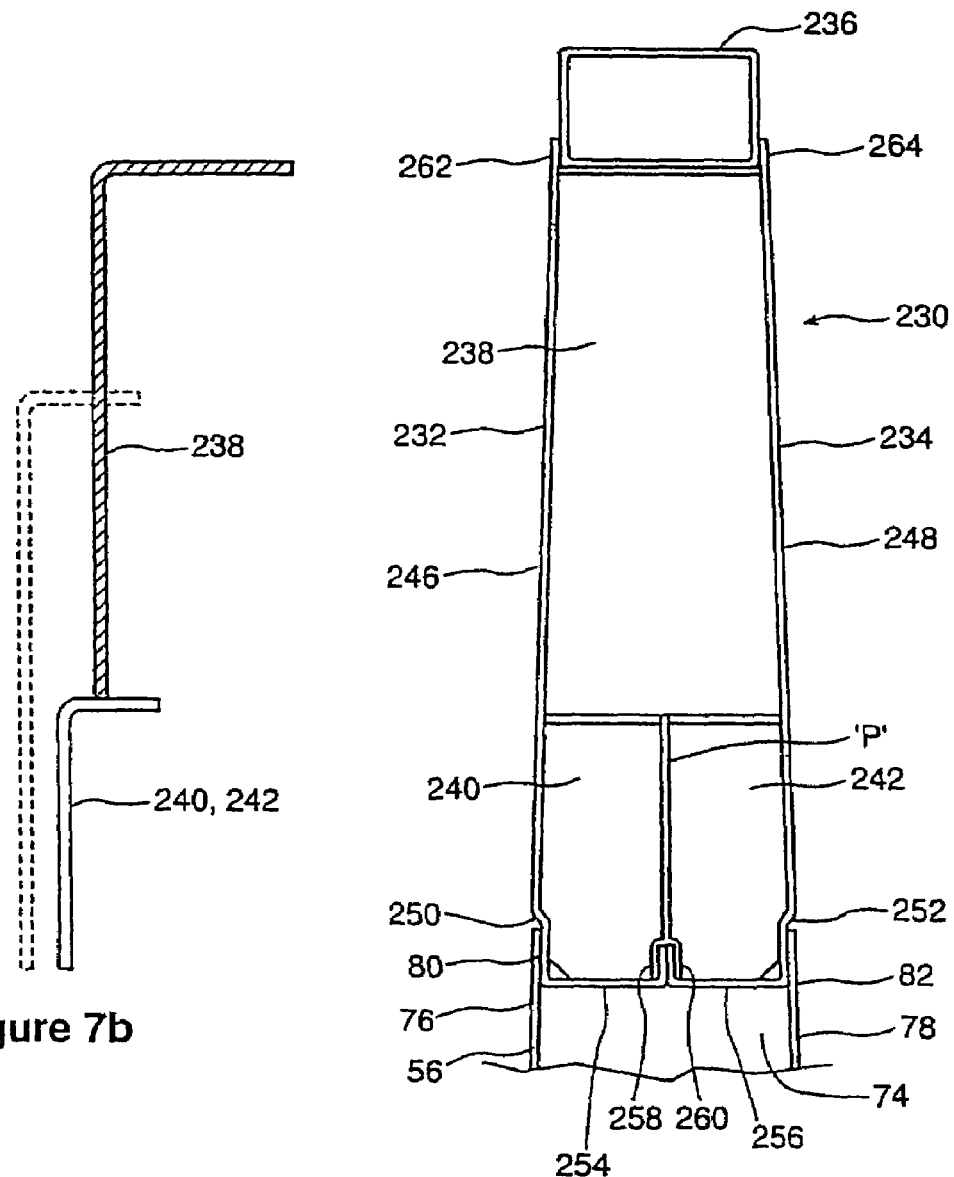

In the alternative embodiment of FIGS. 7a and 7b, a deep upper beam 230 has a pair of formed sections 232, 234, a rectangular steel tube 236, a main gusset 238 and minor gussets 240 and 242. On assembly, minor gussets 240 and 242 are welded inside the lower regions of formed section 232 and 234, being shaped to conform to the shape of the lower region of outer main sheets 246, 248, inwardly stepped shoulder 250, 252, and inwardly extending legs 254, 256. A gap 'P' is left between the respective inboard edges of gussets 240 and 242, and their outboard edges are welded to the inner face of main sheets 246, 248. Gussets 240, 242 are trimmed to be clear of re-entrant toes 258, 260. Main gusset 238 is welded upon minor gussets 240, 242, with its lateral edges welded to the inside face of main sheets 232 and 234. Tabs 262, 264 at the distal ends of main sheets 246, 248 embrace the outer side faces of steel tube 236.

Figures 8A, 8B:
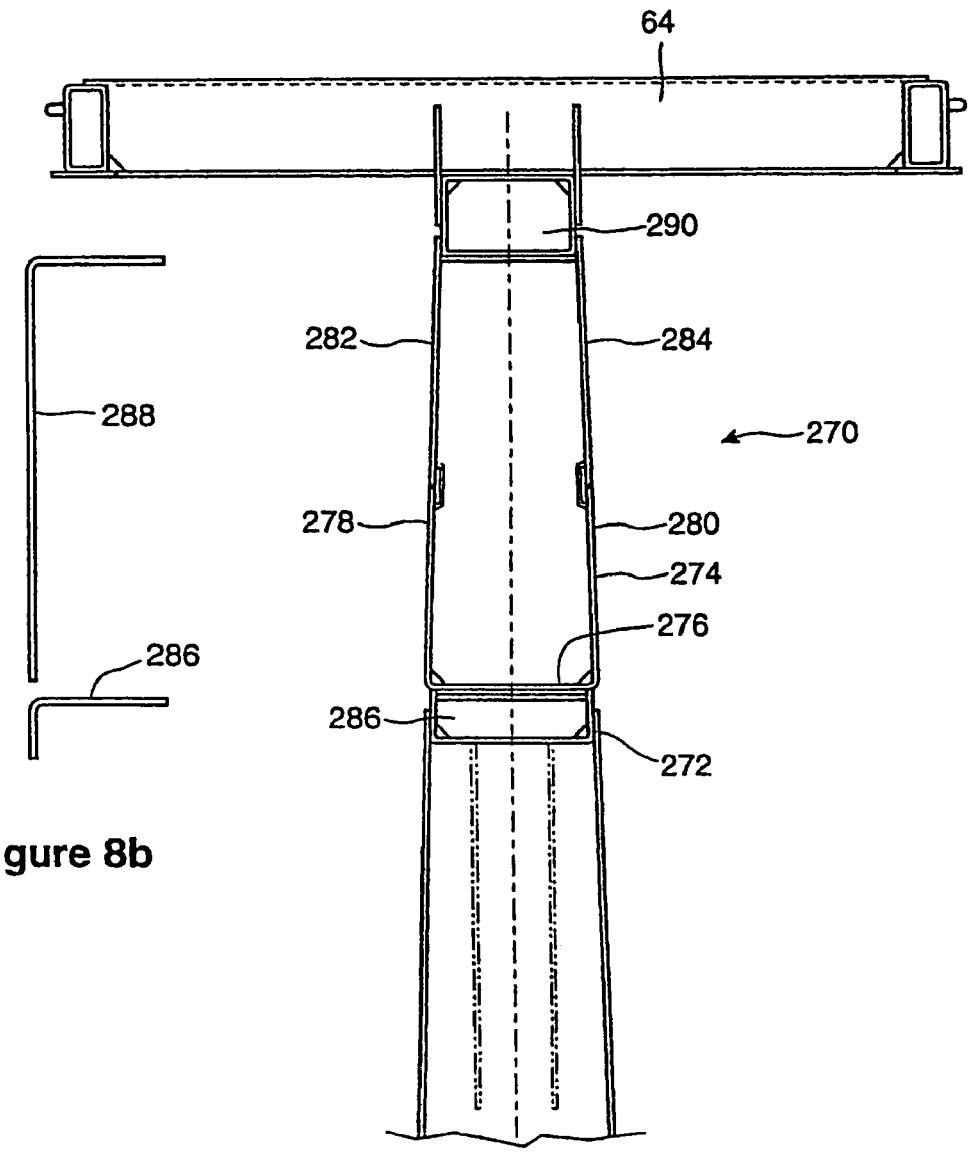

In the alternative embodiment of FIGS. 8a and 8b, a deep upper beam assembly 270 has a longitudinally extending inverted C-channel 272 upon which is welded a generally U-shaped formed section 274 having a back 276 and upwardly extending legs 278, 280 bent to lie on the slopes of the flanges of posts 56 and 57, as above. The distal ends of legs 278 and 280 abut the lower edges of a pair of skirt plates 282 and 284. A weld is formed along the abutting edges of the legs and skirts. At their furthest ends, skirt plates 282, 284 are welded to the outside faces of a steel tube 290. Top truss assembly 64 surmounts assembly 270. Minor gussets 286 are welded inside C-channel 272 at the longitudinal stations of posts 56 and 57, as above, and gussets 288 are welded inside legs 278, 280 and plates 282, 284 thereby providing a form to define the angular profile upon which they lie. As before, that profile is such as to yield a surface lying flush with the outer surfaces of posts 56 and 57.

The alternate embodiment of deep beam 300 of FIGS. 9a and 9b is similar to that of FIGS. 8a and 8b, but differs insofar as C-channel 272 and formed section 274 have been combined into a singular formed section 302 having inwardly stepped shoulders 304 to yield a plug shaped head 306, similar to that described in the context of FIG. 4a. Further, rather than straight legs 278 and 280, formed section 302 has inwardly stepped toes 308 and 310, again, similar to those shown in FIG. 4a. Skirt plates 312 and 314, similar to skirt plates 282 and 284, again extend between toes 308 and 310 to terminate on the outer side faces of a rectangular steel tube 316.

In this instance a large gusset 318 is welded inside section 302, and plates 312 and 314. Gusset 318 has a vertical leg 320 having a profile cut to yield the desired slope continuity with the flanges of posts 56 and 57.

Figure 10:
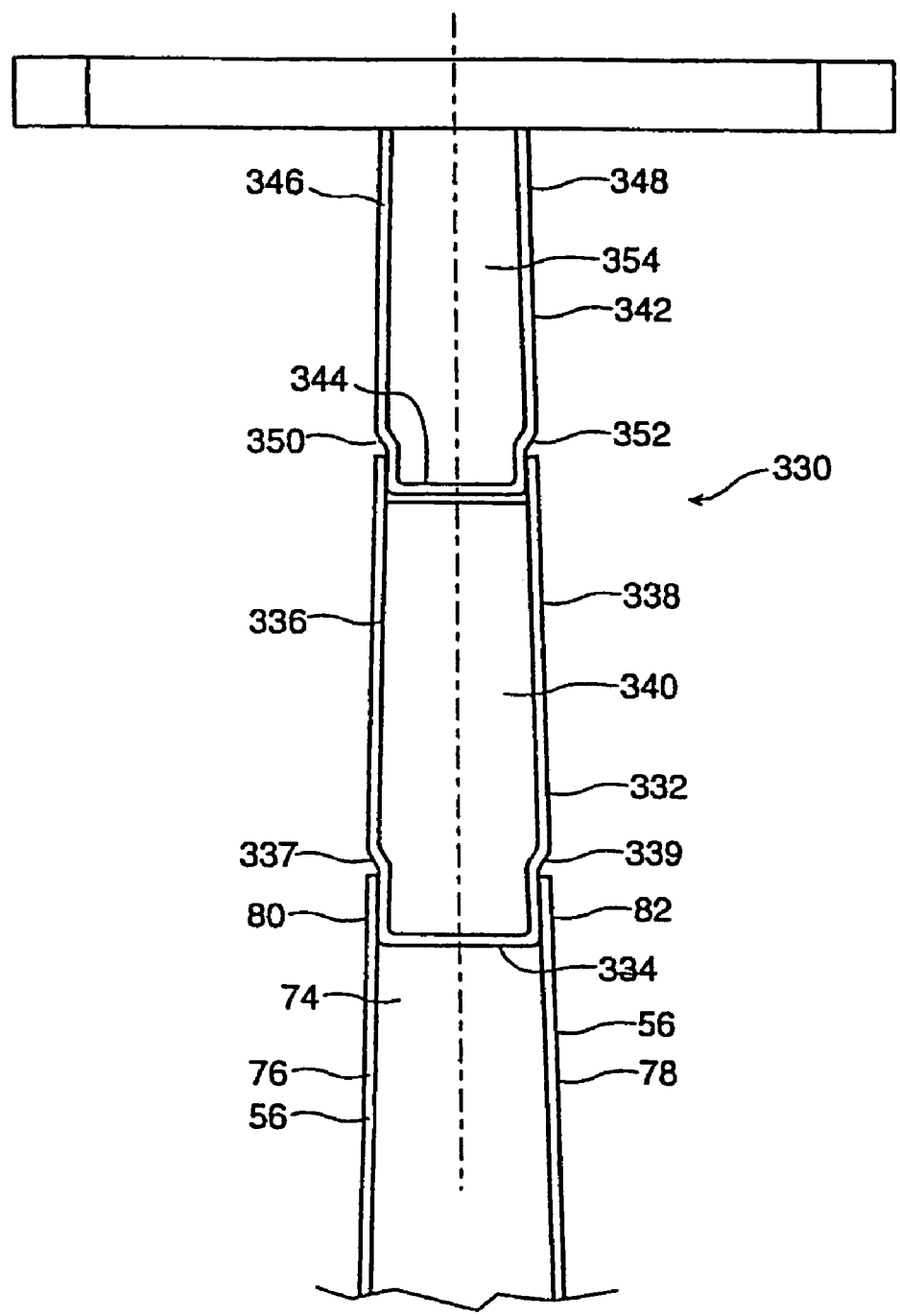

The alternate embodiment of deep beam 330 of FIG. 10 is similar to that of FIG. 8a. However, as in FIG. 9a, C-channel 272 and formed section 274 have been supplanted by a single formed section 332 having a back 334, a pair of legs 336, 338 having inwardly stepped shoulders 337, 339 and a pair of distal toes. A gusset 340 is mounted within formed section 332 at each of the longitudinal stations of car 20 corresponding to the longitudinal stations of the webs of posts 56 and 57, as described above. However, gussets 340 terminate in a horizontal leg lying shy of the tips of the distal toes of legs 336 and 338 such that another formed section 342 can seat between them. Formed section 342 has a back 344, legs 346, 348 and shoulders 350, 352. An internal stiffener in the nature of a gusset 354 is located at each of the longitudinal post stations. Back 344 provides a horizontal web sufficiently close to top truss assembly 64 that no rectangular steel tube is employed. As before, the outer faces of legs 346, 348 and legs 336, 338 are intended to lie in the same planes as the flanges of posts 56 and 57. The external faces of each of formed sections 332 and 342 each extend about a foot in depth, relative to top truss assembly 64, and present, more or less, a 2 foot wide skirt, or band, that overlaps the load limit, and the maximum loading height.

Figure 11:
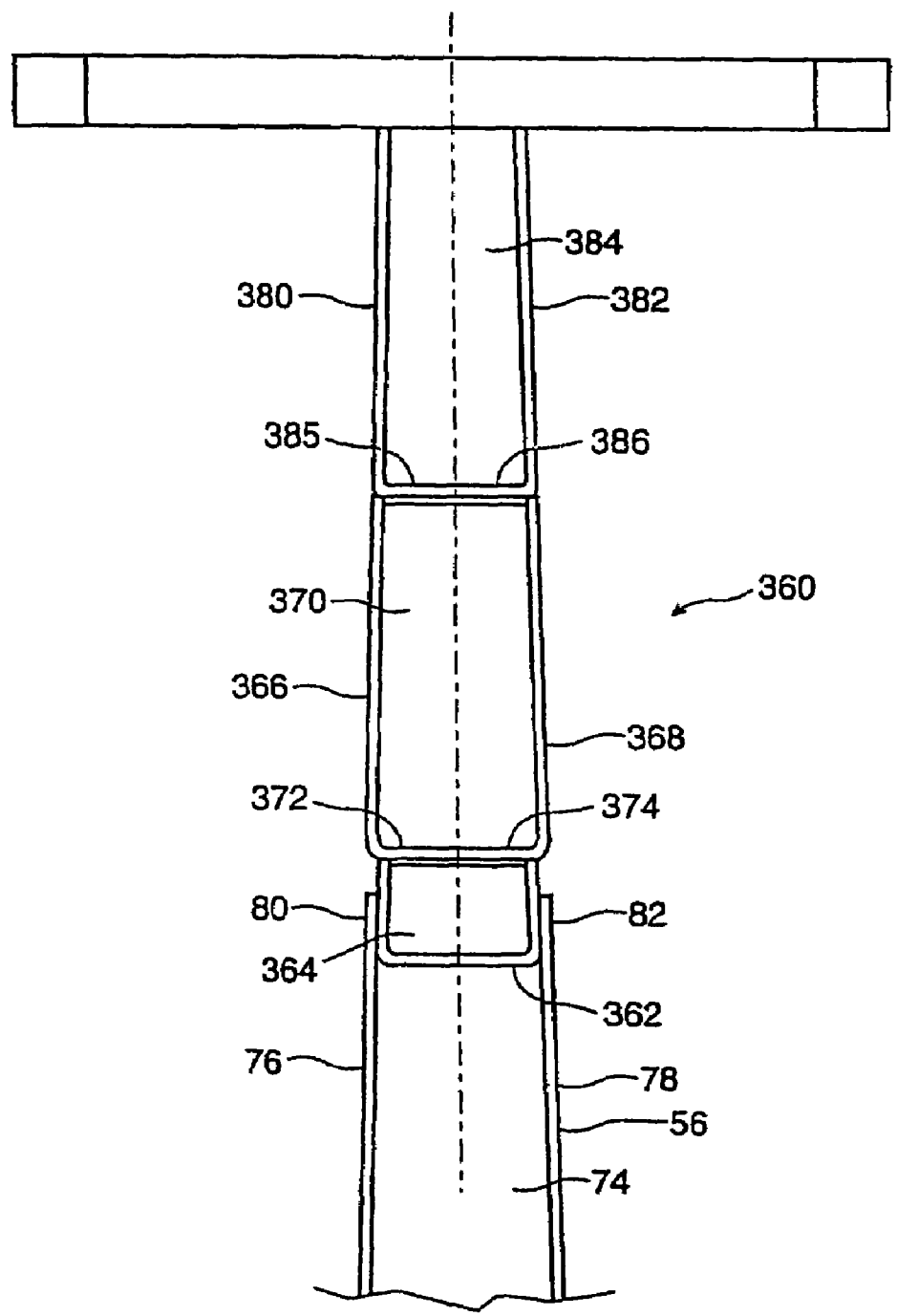

In the embodiment of FIG. 11, a deep beam assembly 360 is generally similar to deep beam assembly 330, but rather than have step-shouldered formed sections it has a C-channel 362 for mounting between tabs 80 and 82 as in FIG. 8a above, with gussets 364 mounted as described in FIG. 8a. Above this is a first pair of angle irons 366, 368, bent to present outer faces lying on the desired slope of the flanges of posts 56 and 57. Angle irons 366, 368 are welded on a series of lateral gussets 370, again, at the longitudinal stations of vertical posts 56 and 57. Angle irons 366 and 368 are also welded along the tips of their inwardly extending toes 372, 374. Another pair of angle irons 380, 382 are welded on an array of gussets 384, and along a seam at their inwardly extending toes 385, 386, and mounted above angle irons 366 and 368, as shown, such that their generally upwardly extending legs, and the consequent skirt-like surface they present, lie flush with, and on the same slopes as, the respective flanges of posts 56 and 57.

Figure 12A:
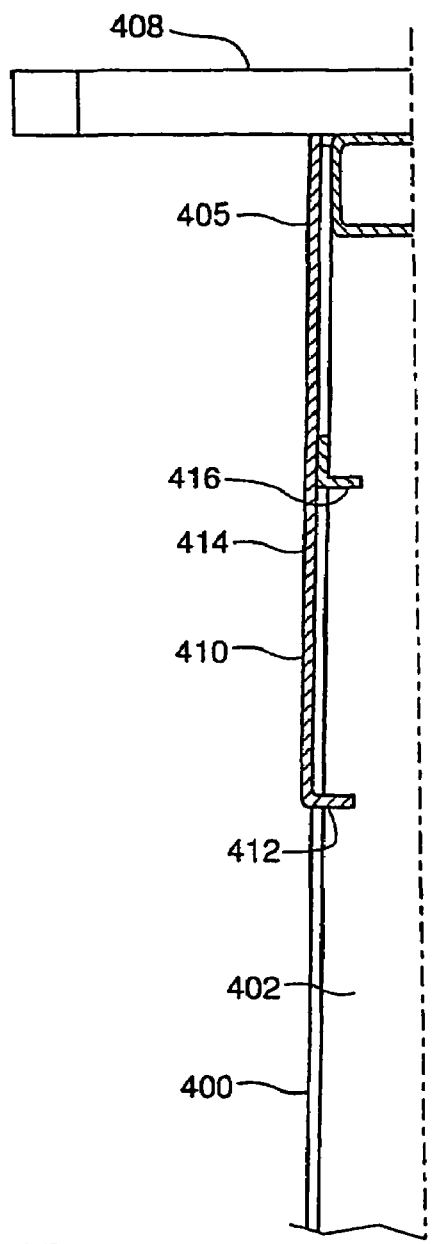

The embodiment of FIG. 12a shows a half view of a retro-fit installation. (As the section is symmetrical about the center line of the car, only one half is illustrated). An existing center beam post is shown as 400. It has a web 402 trimmed down to leave tabs 404 and 405 which lie to either side of, and are welded to, a rectangular steel tube 406 upon which a top truss assembly 408 is mounted. A skirt panel 410 is formed with a stiffener in the nature of an inwardly bent toe 412. The length of main leg 414 is roughly 2 feet, such that its outer face overlaps both the maximum load height and the load limit height. Toe 412 is trimmed to accommodate the flanges of post 400 (analogous to posts 56 or 57). An additional reinforcement, or longitudinal stiffener, in the nature of angle 416 of a length to lie between successive posts 400, is welded to the inner face of main leg 414 at an intermediate level roughly halfway between top truss assembly 408 and toe 412. Angle 416 will tend to cause main leg 414 to resist lateral deflection between adjacent posts 400, thereby tending to assist in maintaining main leg 414 in a position to spread loads placed against it. It is preferred that panel 410 be $3/16$ inches thick, but could be as thick as $1/2$ or $5/8$ inches. Although panel 410 is preferably a metal sheet welded to posts 400, a different fastening means, such as rivets, bolts or the like, could be used. A smooth steel face is preferred, but other metals, such as aluminum, could be used, or a suitable, rot resistant, UV resistant polymer could be selected, either as a solid sheet or as a face coating or layer, or sheet, upon a metal substrate. It is preferred that the material chosen be a non-consumable material, that is, one that may tend not to be prone to require frequent replacement such as may be required if softwood lumber battens are used, and also one that has little or no tendency to develop wood rot or to support the growth of molds.

Figure 12B:
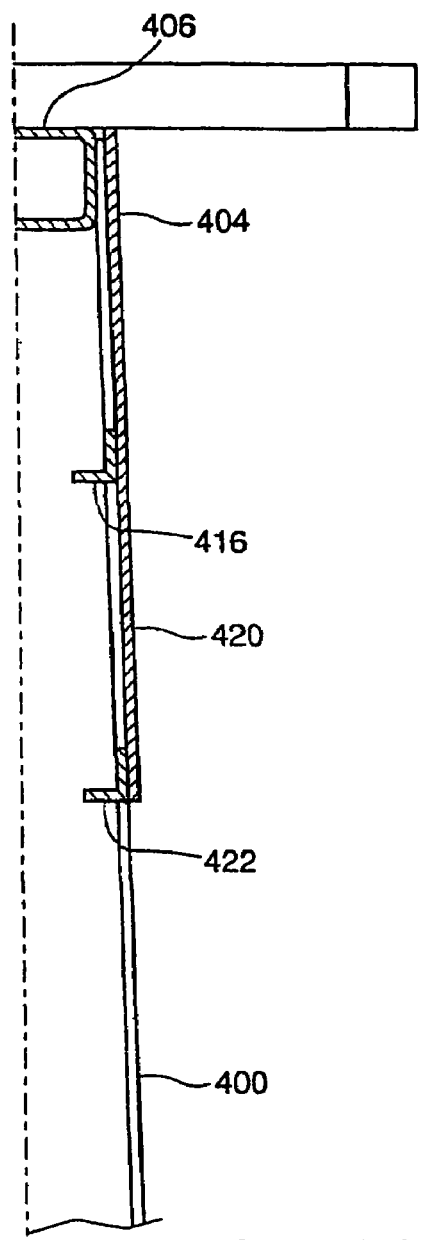

Panel 410 need not be integrally formed with bent toe 412, but could be fabricated by using a flat sheet 420 as the external face plate, with an angle iron 422, or similar stiffener, welded along the inward facing bottom edge of the face plate between pairs of posts 400, as indicated in the other half view shown in FIG. 12b.

FIG. 12c is again a half section, showing a hollow cell panel 424 in place of panel 410. Hollow cell panel 424 has an external skin 426, an internal skin 428, and an intermediate hollow cell core 427 for carrying shear between skins 426 and 428. The hollow cells usually have a hexagonal columnar shape, the columns running perpendicular to the skins. The thickness of hollow cell panel 424 has been exaggerated for the purposes of illustration. Although skins 426 and 428 may be made of steel, they may also be made of other substances, such as structural polymers, reinforced polymers, aluminum, or other suitable material.

Figures 12C, 12E:
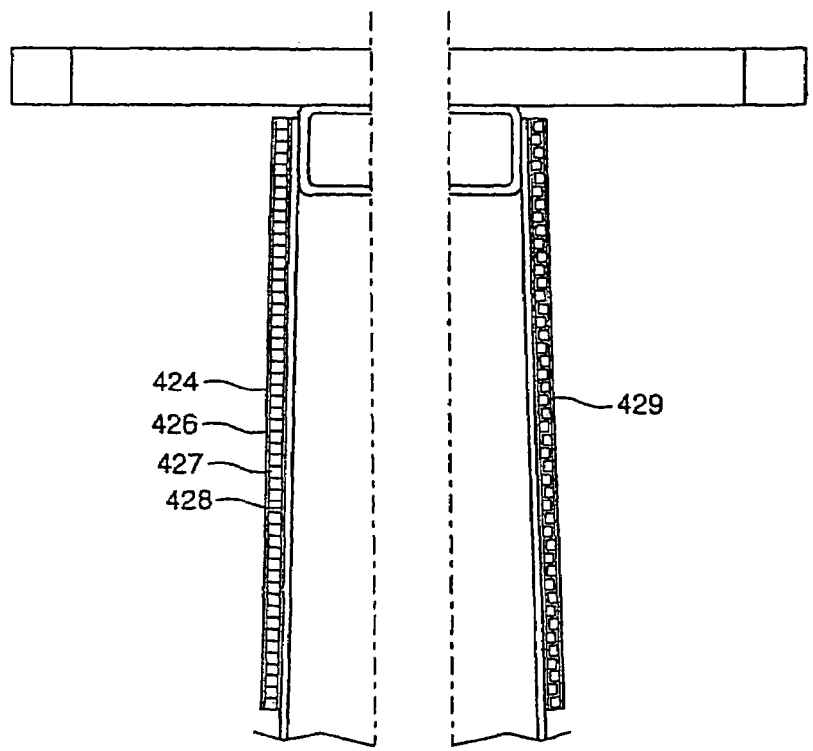
Figures 12D, 12F:
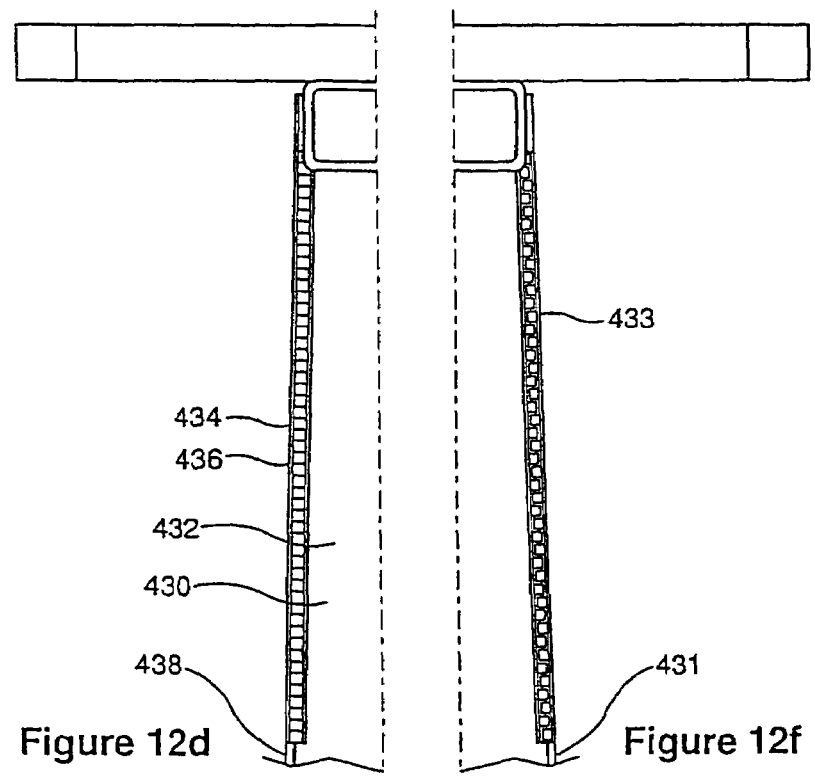
FIG. 12d shows an alternate detail to that of FIG. 12c.
FIG. 12f shows an alternate detail to that of FIG. 12d.

FIG. 12*d* is similar to FIG. 12*c*, but web 430 of post 432 has been trimmed back to permit outwardly facing external face 434 of hollow cell panel 436 to lie flush with flange 438 of post 432. Hollow cell panel 436 is similar in construction to hollow cell panel 424, having a pair of skins and a hollow core.

FIGS. 12*e* and 12*f* correspond to FIGS. 12*c* and 12*d* respectively, and illustrate the use of a corrugated core sandwich, either standing proud of the flange of the post, as illustrated by sandwich 429 in FIG. 12*e*, or flush with a trimmed down flange 431 as shown by sandwich 433 in FIG. 12*f* The corrugated sandwiches have inner and outer metal skins, with a reverse folded, corrugated core maintaining the skins in a spaced apart, parallel planar relationship.

In each of the embodiments illustrated in FIGS. 12*a*, 12*b*, 12*c*, 12*d*, 12*e* and 12*f* the vertical extent of the skirt can be chosen according to the lading customarily carried by the car. As noted above, in general the skirt overlaps the nominal loading height, and extends a modest distance below the nominal loading height, whether 6 inches, 12 inches, 18 inches, 24 inches, 30 inches, or 36 inches. The skirt may also tend to overlap the maximum load limit height, and, further still, to be joined at a welded lap joint to the top chord, or top chord assembly.

Figure 13:
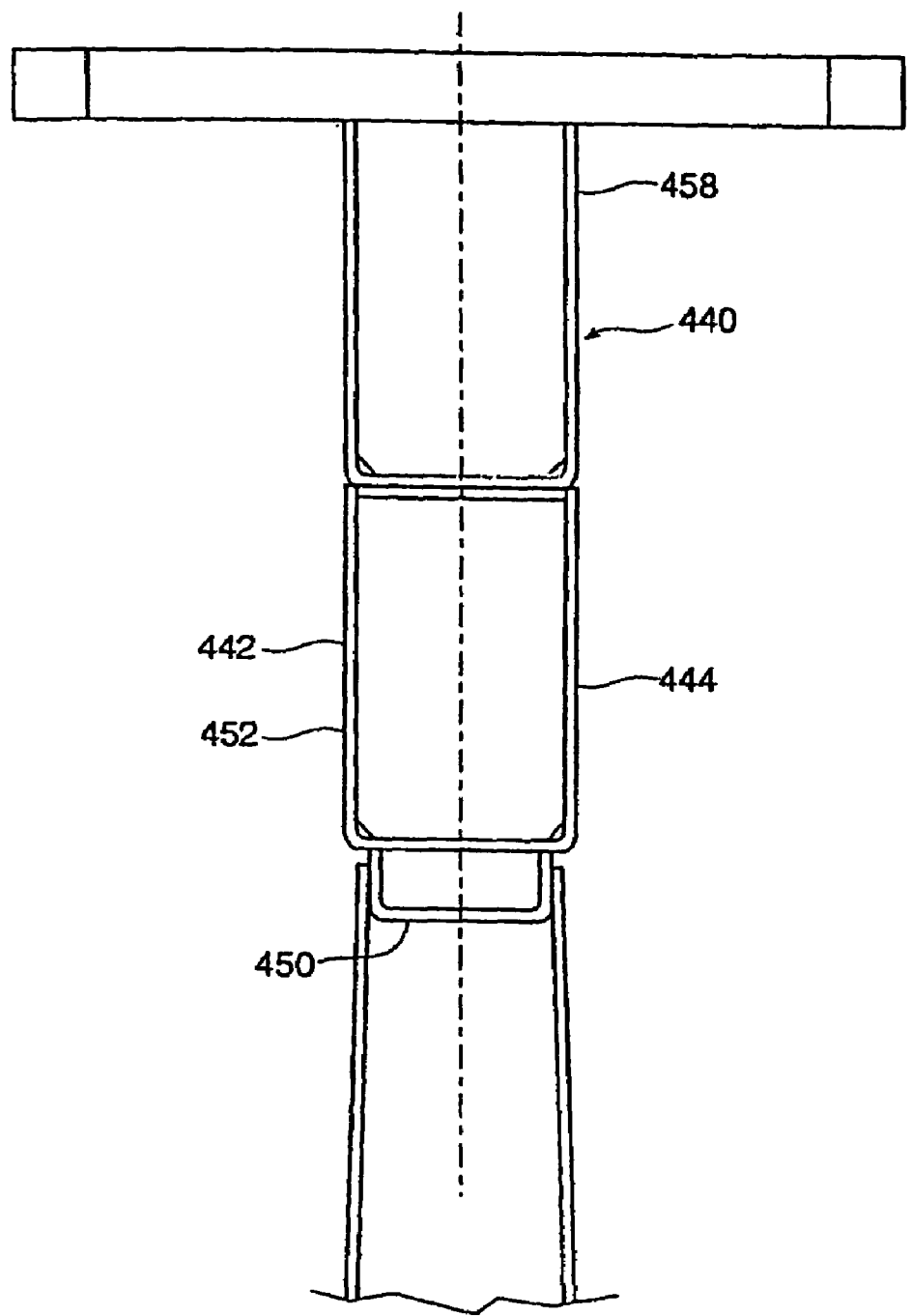

The embodiment of FIG. 13 shows a deep beam assembly 440 that is similar to deep beam assembly 360 of FIG. 11 but does not have slope continuity with the flanges of posts 56 and 57. Rather, the sides 442 and 444 of deep beam assembly 440 are parallel, and rise generally vertically.

Figure 14:
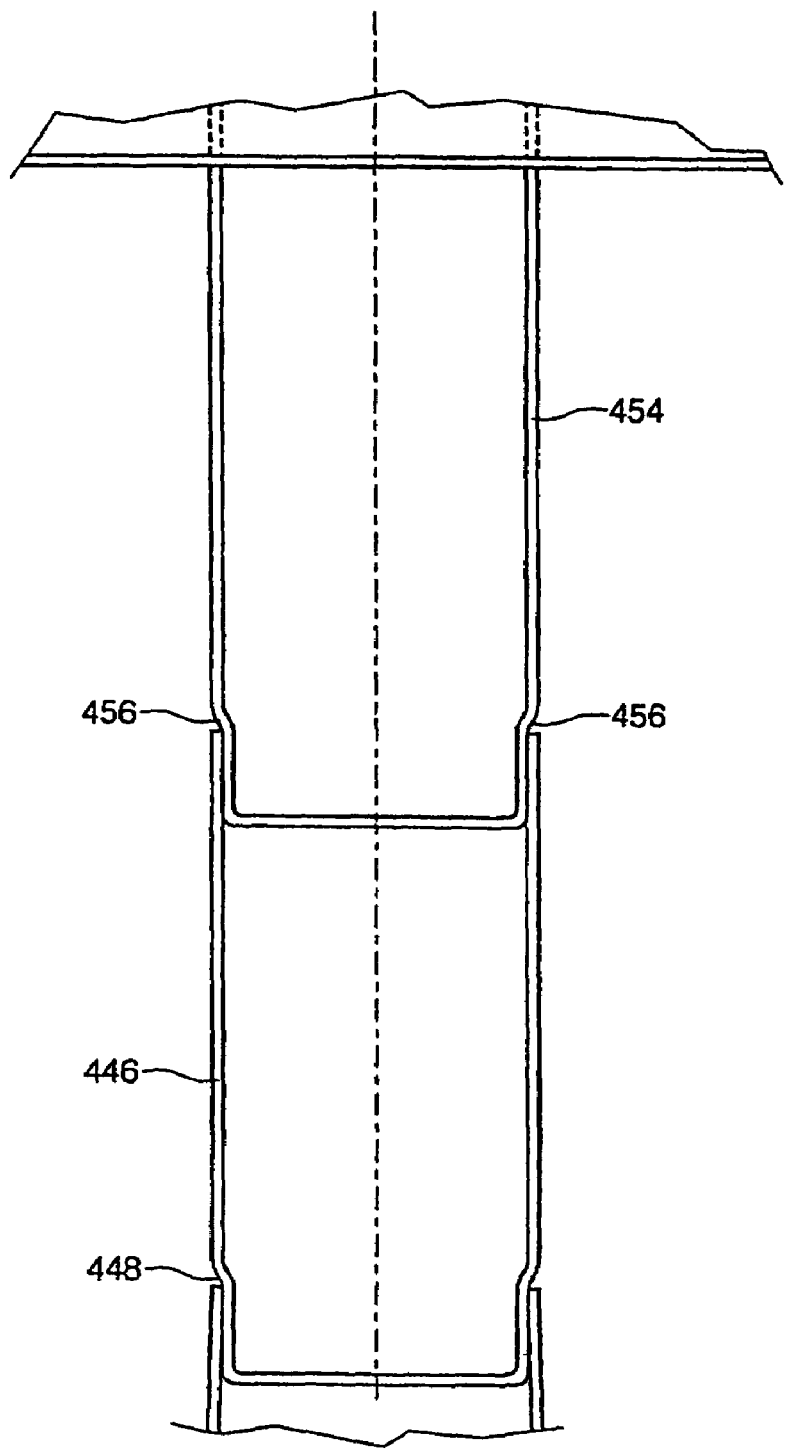

The embodiment of FIG. 14 is similar to the embodiment of FIG. 13, except insofar as it has a single formed section 446 with shoulders 448 in lieu of a C-channel 450 and section 452. Similarly, its upper formed section 454 also has shoulders 456, in contrast to upper section 458 of assembly 440.

Figure 15:
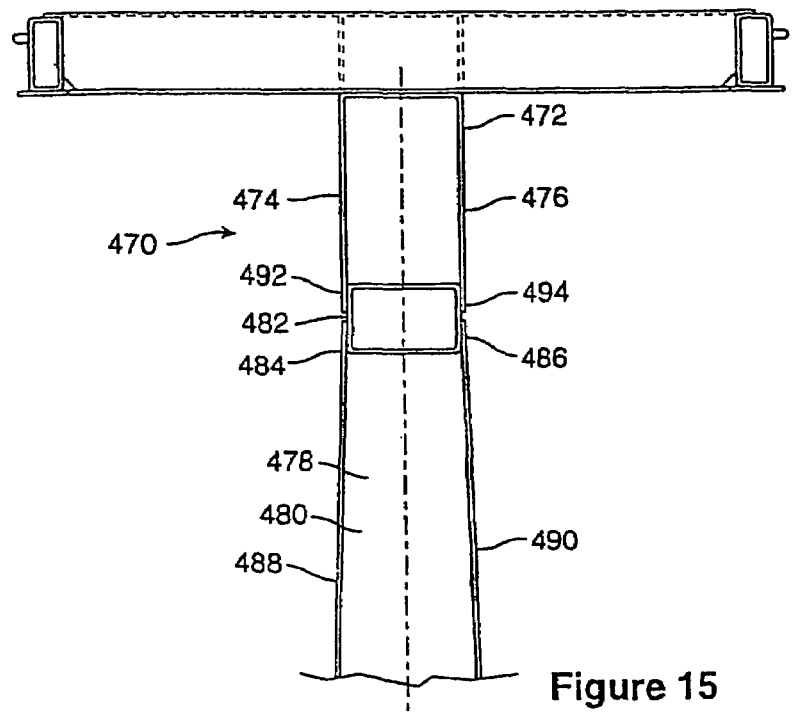
Figure 16:
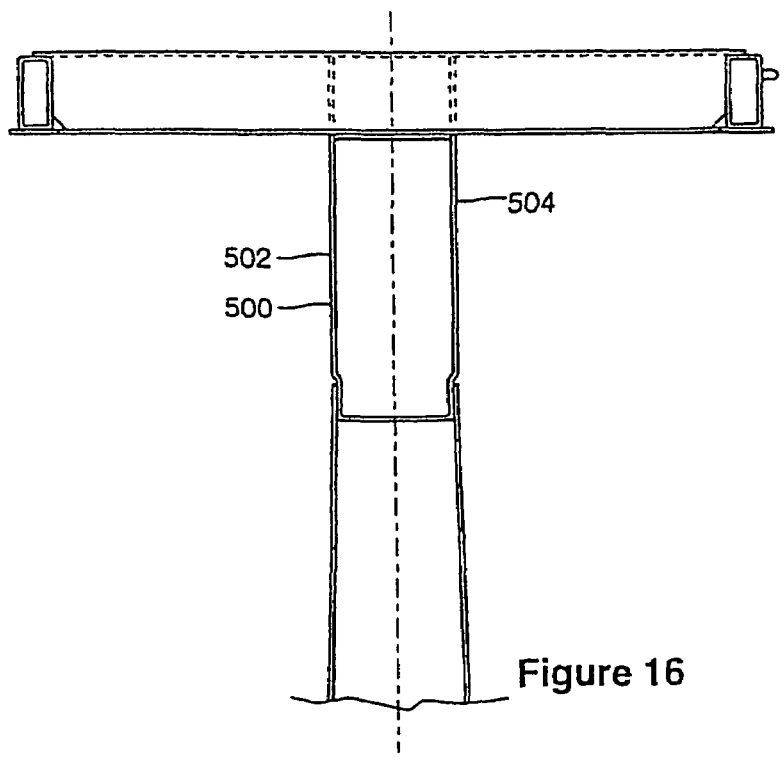

In the embodiment of FIG. 15 deep beam assembly 470 has an inverted U-shaped formed section 472 having parallel legs 474, 476. A notch has been cut in web 478 of post 480 such that a longitudinally extending rectangular steel tube 482 can seat between tabs 484 and 486 of flanges 488 and 490. The distal tips 492 and 494 of legs 474 and 476 are welded along the side faces of tube 482. In the embodiment of FIG. 16 a formed section 500 is used in place of rectangular steel tube 482. In the cases of both FIG. 15 and FIG. 16, the overall depth of the side skirts defined by legs 474, 476 or 502, 504, is roughly half that of the embodiments of FIGS. 4*a*, 5*a*, 6*a*, 7*a*, and 8*a*, being roughly one (1) foot. This width overlaps both the load limit height and the maximum load height.

In the preferred embodiment of FIGS. 2*a*, 3*a*, 3*b*, 4*a* and 4*b*, legs 124 and 134, (or 126 and 135) extend from a root at the join to top truss 64 to a level below the upper load limit. Although other cargoes can be carried, the 132 and ½ inch load limit corresponds to a stack of four 4 bundles of sawn lumber, each bundle being 32 inches thick and 49 inches wide for a total of 128 inches, with 1 and ½ inch thick dunnage between the bundles, for an additional 4 and ½ inches, legs 124 and 134, (or 126 and 135) are roughly 24 inches long so that the bottom edge of legs 134 and 135 will extend down half the height of the top bundle to act as a skirt against which a larger bearing area of the bundle can bear, as compared to the width of the flanges of posts 56 by themselves. The skirt has a mid level reinforcement between its upper and lower extremities, namely gussets 152 and 154 to discourage lateral deflection of the skirt, or bowing inward.

In alternative embodiments, the level of the bottom edge of the legs could be as little as one board (1 and ½ inches, kiln dried wood) below the top edge of the design bundle height, but is expected to be most commonly 12 inches, 24 inches (as in the preferred embodiment) or 30 inches deep when measured from the join to the top truss.

It is possible to manufacture a generally similar center beam car to fall within the loading profile defined by AAR plate 'F', or some other height. In that case, the desired load limit height is the height that is the largest integer multiple of 33 that is less than the clearance opening. The minimum height of the bottom edge of the leg, or skirt, is desirably 1 and ½ inches or more below the nominal load height, typically such that the overall height of the skirt is, nominally, an integer multiple of 6 that is at least 12 inches. Preferably, the skirt extends to a height that is at least half way down the top bundle of the nominal design load, and possibly to a height that is the full depth of the top bundle.

Although the main deck could be a continuous decking structure, this need not necessarily be so. The main deck, or lower beam structure could be in the form of an open truss, or grid work. Car 20, is preferably a car of all-steel construction. However, although the web work assembly of the center beam, and the top truss section is preferably a welded steel fabricated structure, it could be made of aluminum.

An alternate center beam car is shown in FIGS. 2*b* and 2*c* as 520. Car 520 is similar to car 20, and has the same cross-section. However, car 520 has a proportionately greater end overhang. As with car 20, car 520 has an array of vertical posts 522 extending upwardly from a main deck structure 524 to a top chord member 526 that has skirts and reinforcements as described in any of the embodiments described above against which lading can bear. Diagonal bracing 528 is provided, also generally as noted above. As with car 20, car 520 has vertical posts 530 and 531 mounted at the respective longitudinal stations of the first and second truck centers TC. It also has, at each end of the car, a first longitudinally outboard post 532, 533, one pitch longitudinally outboard of the truck centers, and a second longitudinally outboard post 534, 535 a second pitch outboard from the truck centers. A web 538, 539 extends between the second outboard post and the transverse end bulkheads 540, 541, web 538 or 539 being perpendicular to the respective bulkhead. A diagonal bracing member 542, 543 extends from a distal mounting location adjacent to the junction of the second outboard post and top chord member, to a proximal mounting location adjacent to the junction of the truck center post with the main center sill. Diagonal member 542, 543 passes through a mid-portion of first longitudinally outboard post 532, 533. The end section overhang 544, 545 of each end of car 520 (that is, the portion of the deck lying longitudinally outboard of the truck center) is correspondingly increased in length.

The addition of an extra bay (i.e., a pitch between an additional set of vertical posts) to the end overhang of each car, as shown in FIGS. 2*b* and 2*c*, increases the length to width aspect ratio of the car, and increases the potential lateral force to which the trucks can be subject while cornering. For example, car 20 is a 73 foot center beam car having a span of 60 feet between truck centers. The 73 foot dimension refers to the longitudinal clearance between the inner faces of the end bulkheads. Car 20 is 9 ft, 2 inches wide at deck level, (9 ft 3 inches over its winches, 94). It has a length to deck width aspect ratio of just under 8:1, and a one end overhang to length ratio of just under 0.09:1, and an overhang to truck center span ratio for one end of just under 0.11.

By contrast, car 520 is nominally an 81 foot car. It has a 9 ft, 2 inch deck width W, and a length L of 81 ft. between the inner faces of bulkheads 540 and 541. The corresponding length to width aspect ratio is just under 9:1, and its one end overhang to length ratio just under 0.13:1, and an overhang to truck center span ratio, for one end, of 0.175:1. In terms of lading, this means that an 8 ft long bundle of lumber can be loaded fully longitudinally outboard of the truck center. That is, as compared to car 20, car 520 can accommodate 10 stacks of 8-foot long bundles, with four bundles per stack, whereas car 20 can only accommodate 9 of such stacks of 8-foot long bundles.

Various embodiments of the invention have now been described in detail. Since changes in and or additions to the above-described best mode may be made without departing from the nature, spirit or scope of the invention, the invention is not to be limited to those details, but only by the appended claims.

The invention claimed is:

1. A center beam rail road car having a longitudinal centerline, the railroad car being supported by rail car trucks at either end thereof, said rail road car comprising:
   a deck for supporting lading, and a center beam assembly extending upwardly therefrom, said center beam assembly running lengthwise along said railroad car between bulkheads mounted at either end of said rail road car;
   said center beam assembly including an array of posts extending upwardly of said deck, said posts having distal ends located away from said deck;
   said center beam assembly including a longitudinally extending structural member mounted to said distal ends of said posts;
   said center beam assembly having a polymeric member mounted laterally outboard of said longitudinally extending structural member, said polymeric member having a longitudinally extending face against which loads placed laterally outboard thereof can bear; and
   said longitudinally extending structural member including a wall extending laterally inboard away from said longitudinally extending face of said polymeric member.

2. The center beam rail road car of claim 1 wherein said longitudinally extending structural member includes another wall extending in a predominantly vertical plane, and said longitudinally extending face of said polymeric member extends parallel thereto.

3. The center beam rail road car of claim 1 wherein said longitudinally extending structural member includes a predominantly vertically oriented web and said laterally inwardly extending wall of said longitudinally extending structural member is a predominantly horizontally extending portion of said longitudinally extending structural member.

4. The center beam rail road car of claim 1 wherein said longitudinally extending structural member is a tube.

5. The center beam rail road car of claim 4 wherein said tube is a steel tube.

6. The center beam rail road car of claim 1 wherein said longitudinally extending structural member has a hollow closed section.

7. The center beam trail road car of claim 6 wherein said longitudinally extending structural member is a four sided steel tube.

8. The center beam rail road car of claim 6 wherein said longitudinally extending structural member is a rectangular steel tube.

9. The center beam rail road car of claim 8 wherein said polymeric member is between 3/16 and 5/8 inches thick.

10. The center beam rail road car of claim 1 wherein said polymeric member stands proud of said posts.

11. The center beam rail road car of claim 1 wherein said polymeric member stand flush with said posts.

12. The center beam rail road car of claim 1 wherein the polymeric member is made of a UV resistant polymer material.

13. The center beam rail road car of claim 1 wherein said longitudinally extending face of said polymeric member is at least 6 inches wide.

14. A center beam rail road car having a longitudinal centerline, the railroad car being supported by rail car trucks at either end thereof, said rail road car comprising:
   a deck for supporting lading, and a center beam assembly extending upwardly therefrom, said center beam assembly running lengthwise between bulkheads mounted at either end of said rail road car;
   said center beam assembly including an array of posts extending upwardly of said deck, said posts having distal ends located away from said deck;
   said center beam assembly including a first longitudinally extending member mounted to said distal ends of said posts and running lengthwise between said bulkheads;
   said array of posts including a first post and a second post;
   said first and second posts being adjacent to each other;
   said center beam assembly having a second longitudinally extending member, said second longitudinally extending member running along said first longitudinally extending member from said first post to said second post;
   said second longitudinally extending member having a laterally outwardly facing surface located laterally outboard of said first longitudinally extending member, against which laterally outwardly facing surface loads placed laterally outboard thereof can bear;
   said laterally outwardly facing surface is mounted in a position chosen from the set of positions consisting of (a) proud of said array of posts: and (b) flush with said array of posts; and
   said second longitudinally extending member including a wall extending laterally inboard away from said laterally outwardly facing surface of said second longitudinally extending member.

15. The center beam rail road car of claim 14 wherein said first longitudinally extending member is a tube.

16. The center beam rail road car of claim 14 wherein said first longitudinally extending member is a rectangular steel tube.

17. The center beam rail road car of claim 14 wherein said array of posts have flanges having laterally outwardly facing surfaces, and said laterally outwardly facing surface of said second longitudinally extending member is parallel to said laterally outwardly facing surfaces of said flanges.

18. The center beam rail road car of claim 14 wherein said laterally facing surface of said second longitudinally extending member is polymeric.

19. The center beam rail road car of claim 14 wherein said first longitudinally extending member is a rectangular steel tube, and said second longitudinally extending member is a polymeric member.

* * * * *

UNITED STATES PATENT AND TRADEMARK OFFICE
CERTIFICATE OF CORRECTION

| | | |
|---|---|---|
| PATENT NO. | : 7,108,467 B2 | |
| APPLICATION NO. | : 10/807905 | |
| DATED | : September 19, 2006 | |
| INVENTOR(S) | : James W. Forbes | |

It is certified that error appears in the above-identified patent and that said Letters Patent is hereby corrected as shown below:

IN THE CLAIMS:

In claim 7, column 15, line 65, delete the word "trail" and insert the word --rail--.

Signed and Sealed this

Sixth Day of March, 2007

JON W. DUDAS
*Director of the United States Patent and Trademark Office*